United States Patent
Goyal

(10) Patent No.: US 8,489,764 B2
(45) Date of Patent: *Jul. 16, 2013

(54) RESTRICTING COMMUNICATION OF SELECTED PROCESSES TO A SET OF SPECIFIC NETWORK ADDRESSES

(75) Inventor: Pawan Goyal, Mountain View, CA (US)

(73) Assignee: Digital Asset Enterprises, L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/772,982

(22) Filed: May 3, 2010

(65) Prior Publication Data

US 2011/0238832 A1    Sep. 29, 2011

Related U.S. Application Data

(60) Continuation of application No. 12/025,727, filed on Feb. 4, 2008, now Pat. No. 7,739,401, which is a division of application No. 09/503,975, filed on Feb. 14, 2000, now Pat. No. 7,343,421.

(51) Int. Cl.
   *G06F 13/00* (2006.01)

(52) U.S. Cl.
   USPC .................................................. 709/238

(58) Field of Classification Search
   USPC .......................................................... 709/238
   See application file for complete search history.

(56) References Cited

U.S. PATENT DOCUMENTS

| | | |
|---|---|---|
| 3,377,624 A | 4/1968 | Nelson et al. |
| 4,177,510 A | 12/1979 | Appell et al. |
| 5,189,667 A | 2/1993 | Esaki et al. |
| 5,212,793 A | 5/1993 | Donica et al. |
| 5,226,160 A | 7/1993 | Waldron et al. |
| 5,249,290 A | 9/1993 | Heizer |
| 5,263,147 A | 11/1993 | Francisco et al. |
| 5,325,530 A | 6/1994 | Mohrmann |
| 5,437,032 A | 7/1995 | Wolf et al. |
| 5,528,753 A | 6/1996 | Fortin |
| 5,572,680 A | 11/1996 | Ikeda et al. |
| 5,584,023 A | 12/1996 | Hsu |

(Continued)

FOREIGN PATENT DOCUMENTS

| JP | 64002145 A | 1/1989 |
|---|---|---|
| WO | WO-9939261 A1 | 8/1999 |

OTHER PUBLICATIONS

Boehm, B., "Managing Software Productivity and Reuse," IEEE Computer, vol. 32, No. 9, Sep. 1999, 3 pages.

(Continued)

*Primary Examiner* — Larry Donaghue
(74) *Attorney, Agent, or Firm* — Perkins Coie LLP

(57) ABSTRACT

Selected processes are associated with sets of specific network addresses, and the associations are stored. When a selected process creates a child process, an association between the child process and the set of network addresses with which the parent process is associated is stored. When a selected process is deleted, the association between the selected process and its set of network addresses is deleted. Each selected process is restricted to network address-based communication via its associated set of network addresses. Certain communication protocol subroutines associated with network address-based communication are intercepted by an interception module. The interception module detects attempts by selected processes to communicate via network addresses. If a selected process attempts to communicate via an unassociated network addresses, the attempted communication is prohibited.

35 Claims, 5 Drawing Sheets

U.S. PATENT DOCUMENTS

| | | | |
|---|---|---|---|
| 5,603,020 A | 2/1997 | Hashimoto et al. |
| 5,615,400 A | 3/1997 | Cowsar et al. |
| 5,623,492 A | 4/1997 | Teraslinna |
| 5,636,371 A | 6/1997 | Yu |
| 5,640,595 A | 6/1997 | Baugher et al. |
| 5,692,047 A | 11/1997 | McManis |
| 5,706,097 A | 1/1998 | Schelling et al. |
| 5,706,453 A | 1/1998 | Cheng et al. |
| 5,708,774 A | 1/1998 | Boden |
| 5,719,854 A | 2/1998 | Choudhury et al. |
| 5,727,147 A | 3/1998 | van Hoff |
| 5,727,203 A | 3/1998 | Hapner et al. |
| 5,748,614 A | 5/1998 | Wallmeier |
| 5,752,003 A | 5/1998 | Hart |
| 5,761,477 A | 6/1998 | Wahbe et al. |
| 5,764,889 A | 6/1998 | Ault et al. |
| 5,781,550 A | 7/1998 | Templin et al. |
| 5,799,173 A | 8/1998 | Gossler et al. |
| 5,809,527 A | 9/1998 | Cooper et al. |
| 5,828,893 A | 10/1998 | Wied et al. |
| 5,838,686 A | 11/1998 | Ozkan |
| 5,838,916 A | 11/1998 | Domenikos et al. |
| 5,842,002 A | 11/1998 | Schnurer et al. |
| 5,845,129 A | 12/1998 | Wendorf et al. |
| 5,850,399 A | 12/1998 | Ganmukhi et al. |
| 5,860,004 A | 1/1999 | Fowlow et al. |
| 5,864,683 A | 1/1999 | Boebert et al. |
| 5,889,956 A | 3/1999 | Hauser et al. |
| 5,889,996 A | 3/1999 | Adams |
| 5,892,968 A | 4/1999 | Iwasaki et al. |
| 5,905,730 A | 5/1999 | Yang et al. |
| 5,905,859 A | 5/1999 | Holloway et al. |
| 5,913,024 A | 6/1999 | Green et al. |
| 5,915,085 A | 6/1999 | Koved |
| 5,915,095 A | 6/1999 | Miskowiec |
| 5,918,018 A | 6/1999 | Gooderum et al. |
| 5,920,699 A | 7/1999 | Bare |
| 5,933,603 A | 8/1999 | Vahalia et al. |
| 5,937,159 A | 8/1999 | Meyers et al. |
| 5,956,481 A | 9/1999 | Walsh et al. |
| 5,961,582 A | 10/1999 | Gaines |
| 5,978,373 A | 11/1999 | Hoff et al. |
| 5,982,748 A | 11/1999 | Yin et al. |
| 5,987,242 A | 11/1999 | Bentley et al. |
| 5,987,524 A | 11/1999 | Yoshida et al. |
| 5,987,608 A | 11/1999 | Roskind |
| 5,991,812 A | 11/1999 | Srinivasan |
| 5,999,963 A | 12/1999 | Bruno et al. |
| 6,016,318 A | 1/2000 | Tomoike |
| 6,018,527 A | 1/2000 | Yin et al. |
| 6,023,721 A | 2/2000 | Cummings |
| 6,038,608 A | 3/2000 | Katsumata |
| 6,038,609 A | 3/2000 | Geulen |
| 6,047,325 A | 4/2000 | Jain et al. |
| 6,055,617 A | 4/2000 | Kingsbury |
| 6,055,637 A | 4/2000 | Hudson et al. |
| 6,061,349 A | 5/2000 | Coile et al. |
| 6,065,118 A | 5/2000 | Bull et al. |
| 6,075,791 A | 6/2000 | Chiussi et al. |
| 6,075,938 A | 6/2000 | Bugnion et al. |
| 6,078,929 A | 6/2000 | Rao |
| 6,078,957 A | 6/2000 | Adelman et al. |
| 6,086,623 A | 7/2000 | Broome et al. |
| 6,092,178 A | 7/2000 | Jindal et al. |
| 6,094,674 A | 7/2000 | Hattori et al. |
| 6,101,543 A | 8/2000 | Alden et al. |
| 6,108,701 A | 8/2000 | Davies et al. |
| 6,108,759 A | 8/2000 | Orcutt et al. |
| 6,122,673 A | 9/2000 | Basak et al. |
| 6,154,776 A | 11/2000 | Martin |
| 6,154,778 A | 11/2000 | Koistinen et al. |
| 6,161,139 A | 12/2000 | Win et al. |
| 6,167,520 A | 12/2000 | Touboul |
| 6,172,981 B1 | 1/2001 | Cox et al. |
| 6,189,046 B1 | 2/2001 | Moore et al. |
| 6,192,389 B1 | 2/2001 | Ault et al. |
| 6,192,512 B1 | 2/2001 | Chess |
| 6,230,203 B1 | 5/2001 | Koperda et al. |
| 6,240,463 B1 | 5/2001 | Benmohamed et al. |
| 6,247,057 B1 | 6/2001 | Barrera, III |
| 6,247,068 B1 | 6/2001 | Kyle |
| 6,259,699 B1 | 7/2001 | Opalka et al. |
| 6,266,678 B1 | 7/2001 | McDevitt et al. |
| 6,269,404 B1 | 7/2001 | Hart et al. |
| 6,279,039 B1 | 8/2001 | Bhat et al. |
| 6,279,040 B1 | 8/2001 | Ma et al. |
| 6,282,581 B1 | 8/2001 | Moore et al. |
| 6,282,703 B1 | 8/2001 | Meth et al. |
| 6,286,047 B1 | 9/2001 | Ramanathan et al. |
| 6,298,479 B1 | 10/2001 | Chessin et al. |
| 6,314,558 B1 | 11/2001 | Angel et al. |
| 6,327,622 B1 | 12/2001 | Jindal et al. |
| 6,336,138 B1 | 1/2002 | Caswell et al. |
| 6,351,775 B1 | 2/2002 | Yu |
| 6,353,616 B1 | 3/2002 | Elwalid et al. |
| 6,363,053 B1 | 3/2002 | Schuster et al. |
| 6,366,958 B1 | 4/2002 | Ainsworth et al. |
| 6,370,583 B1 | 4/2002 | Fishler et al. |
| 6,374,292 B1 | 4/2002 | Srivastava et al. |
| 6,381,228 B1 | 4/2002 | Prieto, Jr. et al. |
| 6,385,638 B1 | 5/2002 | Baker-Harvey |
| 6,385,722 B1 | 5/2002 | Connelly et al. |
| 6,389,448 B1 | 5/2002 | Primak et al. |
| 6,393,484 B1 | 5/2002 | Massarani |
| 6,425,003 B1 | 7/2002 | Herzog et al. |
| 6,430,622 B1 | 8/2002 | Aiken, Jr. et al. |
| 6,434,631 B1 | 8/2002 | Bruno et al. |
| 6,434,742 B1 | 8/2002 | Koepele, Jr. |
| 6,438,134 B1 | 8/2002 | Chow et al. |
| 6,442,164 B1 | 8/2002 | Wu |
| 6,449,652 B1 | 9/2002 | Blumenau et al. |
| 6,457,008 B1 | 9/2002 | Rhee et al. |
| 6,463,459 B1 | 10/2002 | Orr et al. |
| 6,470,398 B1 | 10/2002 | Zargham et al. |
| 6,484,173 B1 | 11/2002 | O'Hare et al. |
| 6,487,578 B2 | 11/2002 | Ranganathan |
| 6,487,663 B1 | 11/2002 | Jaisimha et al. |
| 6,490,670 B1 | 12/2002 | Collins et al. |
| 6,496,847 B1 | 12/2002 | Bugnion et al. |
| 6,499,137 B1 | 12/2002 | Hunt |
| 6,529,950 B1 | 3/2003 | Lumelsky et al. |
| 6,529,985 B1 | 3/2003 | Deianov et al. |
| 6,542,167 B1 | 4/2003 | Darlet et al. |
| 6,553,413 B1 | 4/2003 | Leighton et al. |
| 6,578,055 B1 | 6/2003 | Hutchison et al. |
| 6,578,068 B1 | 6/2003 | Bowman-Amuah |
| 6,580,721 B1 | 6/2003 | Beshai |
| 6,590,588 B2 | 7/2003 | Lincke et al. |
| 6,622,159 B1 | 9/2003 | Chao et al. |
| 6,625,650 B2 | 9/2003 | Stelliga |
| 6,647,422 B2 | 11/2003 | Wesinger, Jr. et al. |
| 6,658,571 B1 | 12/2003 | O'Brien et al. |
| 6,691,312 B1 | 2/2004 | Sen et al. |
| 6,725,456 B1 | 4/2004 | Bruno et al. |
| 6,754,716 B1 * | 6/2004 | Sharma et al. ............... 709/238 |
| 6,760,775 B1 | 7/2004 | Anerousis et al. |
| 6,779,016 B1 | 8/2004 | Aziz et al. |
| 6,785,728 B1 | 8/2004 | Schneider et al. |
| 6,820,117 B1 | 11/2004 | Johnson |
| 6,859,835 B1 | 2/2005 | Hipp |
| 6,912,590 B1 | 6/2005 | Lundbäck et al. |
| 7,343,421 B1 * | 3/2008 | Goyal ............................ 709/238 |
| 7,739,401 B2 | 6/2010 | Goyal |
| 2009/0049193 A1 | 2/2009 | Goyal |

OTHER PUBLICATIONS

Corbato, F.J. et al. "An Experimental Timesharing System," Proceedings of the American Federation of Information Processing Societies Spring Joint Computer Conference, San Francisco, CA, May 1-3, 1962, pp. 335-344.

Deutsch, P. and Grant, C.A., "A Flexible Measurement Tool for Software Systems," Information Processing 71 (Proc. of the IFIP Congress), 1971, pp. 320-326.

Edjlali, G., et al., "History-based Access Control for Mobile Code," Fifth ACM Conference on Computer and Communication Security, Nov. 3-5, 1998, 19 pages.

Erlingsson, U. and Schneider, F.B., "SASI Enforcement of Security Policies: A Retrospective," Proc. New Security Paradigms Workshop, Apr. 2, 1999, pp. 1-17.

Evans, D. and Twyman, A., "Flexible Policy-Directed Code Safety," Proc. of 1999 IEEE Symposium on Security and Privacy, Oakland, CA, May 9-12, 1999, pp. 1-14.

Fraser, T. et al., "Hardening COTS Software with Generic Software Wrappers," Proc. of 1999 IEEE Symposium on Security and Privacy, 1999, 15 pages.

Goldberg, I. et al., "A Secure Environment for Untrusted Helper Applications (Confining the Wily hacker)," Proc. of the Sixth USENIX UNIX Security Symposium, San Jose, CA, Jul. 1996, 14 pages.

Goldberg, R.P., "Survey of Virtual Machine Research," IEEE Computer, Jun. 1974, pp. 34-45.

Pandey, R. and Hashii, B., "Providing Fine-Grained Access Control For Mobile Programs Through Binary Editing," Technical Report TR9808, University of California, Davis, CA, 1998, pp. 1-32.

Ritchie, D.M., "The Evolution of the Unix Time-Sharing System," AT&T Bell Laboratories Technical Journal 63, No. 6, Part 2, Oct. 1984, (originally presented 1979), 11 pages.

Saltzer, J., H. and Schroeder, M.D., "The Protection of Information I Computer Systems," [online], 1973, [retrieved on Apr. 2, 2002]. Retrieved from the Internet: <URL: http://www.cs.virginia.edu.about.evans/cs551/saltzer/>.

Wahbe, R., et al., "Efficient Software-Based Fault Isolation," Proc. of the Symposium on Operating System Principles, 1993, 14 pages.

Goyal, Pawan et al., "Generalized Guaranteed Rate Scheduling Algorithms: A Framework," IEEE/ACM Transactions, vol. 5 Issue 4, Aug. 1997, pp. 561-571.

Goyal, P. et al., "Start-time Fair Queuing: A Scheduling Algorithm for Integrated Services Packet Switching Networks," Proceedings of ACM SIGCOMM '96, San Francisco, CA, Aug. 1996, 14 pages.

Janosi, T., Notes on A Hierarchical CPU Scheduler for Multimedia Operating Systems by Pawan Goyal, Xingang Guo and Harrick Vin, [online], [retrieved on May 8, 2000]. Retrieved from the internet: <URL:http://cs.cornell.edu/Info/Courses/Sprinq-97/CS614/aov.html>.

Goyal, P., "Packet Scheduling Algorithms for Integrated Services Networks," PhD Dissertation, University of Texas, Austin, TX, Aug. 1997.

Pending United States patent application entitled "Providing Quality of Service Guarantees to Virtual Hosts," U.S. Appl. No. 09/452,286, filed Nov. 30, 1999, 77 pp.

Pending United States patent application entitled "Selective Interception of System Calls," U.S. Appl. No. 09/499,098, filed Feb. 4, 2000, 53 pp.

Pending United States patent application entitled "Dynamic Scheduling of Task Streams in a Multiple-Resource System to Ensure Task Stream Quality of Service," U.S. Appl. No. 09/498,450, filed Feb. 4, 2000, 26 pp.

Pending United States patent application entitled "Disambiguating File Descriptors," U.S. Appl. No. 09/500,212, filed Feb. 8, 2000, 61 pp.

Pending United States patent application entitled "Restricting Communication Between Network Devices on a Common Network," U.S. Appl. No. 09/502,155, filed Feb. 11, 2000, 26 pp.

Keshav, S., An Engineering Approach to Computer Networking: ATM Networks, the Internet, and the Telephone Network, Reading, MA, Addison-Wesley, 1997, pp. vii-xi, 85-115, 209-355, 395-444.

Stevens, R. W., UNIX Network Programming vol. 1 Networking APIs: Sockets and XTI, Upper Saddle River, NJ, Prentice Hall, 1998, pp. v-xiv, 29-53, 85-110 727-760.

Tanenbaum, A. S. and Woodhull, A. S., Operating Systems: Design and Implementation, Upper Saddle River, NJ, Prentice Hall, 1997 pp. vii-xiv, 1-46, 401-454.

Rubini, A., LINUX Device Drivers, Sebastopol, CA, O'Reilly & Associates, Inc., 1998, pp. v-x, 13-40.

Goyal, P., et al., "A Hierarchical CPU Scheduler for Multimedia Operating Systems," Proceedings of the Second Symposium on Operating Systems Design and Implementations (OSDI'96), Seattle, WA, Oct. 1996, 15 pages.

Laurie, B. and Laurie, P., Apache The Definitive Guide, Sebastopol, CA O'Reilly & Associates, Inc., Feb. 1999, pp. v-viii 43-74.

Aho, A. V. and Ullman J. D., Principles of Complier Design, Reading, MA, 1977, pp. vii-x, 359-362, 519-522.

Jonsson, J., "Exploring the Importance of Preprocessing Operations in Real-Time Multiprocessor Scheduling," Proc. of the IEEE Real-Time Systems Symposium—Work-in-Progress session, San Francisco, CA, Dec. 4, 1997, pp. 31-34.

Rusling, D. A, Processes, [online], [retrieved on Dec. 7, 1999]. Retrieved from the Internet: <URL: http://www.cebaf.oovl.about.saw/linuxltlk-html/node44.html>.

Rusling, D. A, Linux Processes, [online], [retrieved on Dec. 7, 1999]. Retrieved from the Internet: <URL: http://www.cebaf.oov/.about.saw/linuxltlk-html/node45.html>.

Rusling, D. A., Identifiers, [online], [retrieved on Dec. 7, 1999]. Retrieved from the Internet: <URL: http://www.cebaf.oov/.about.saw/linuxltlk-html/node46.html>.

Rusling, D. A., Scheduling, [online], [retrieved on Dec. 7, 1999]. Retrieved from the Internet: <URL: http://www.cebaf.oov/.about.saw/linuxltlk-html/node47.html>.

Rusling, D. A., Scheduling in Multiprocessor Systems, [online], [retrieved on Dec. 7, 1999]. Retrieved from the Internet: <URL:http://www.cebaf.gov/about.saw/linuxltlkhtml/node48.html>.

Rusling, D. A., Files, [online], [retrieved on Dec. 7, 1999]. Retrieved from the Internet: <URL:http://www.cebaf.gov/.about.saw/linuxltlk-html/node49.html>.

Plummer, D. C., An Ethernet Address Resolution Protocol-or-Converting Network Protocol Addresses to 48.bit Ethernet Address for Transmission on Ethernet Hardware, Nov. 1982, [online], [retrieved on Jan. 17, 2000]. Retrieved from the Internet: <URL:http://www.mso.netlkadow/answers/extras/rfclrfc826.txt>.

Huang, X. W. et al., "The ENTRAPID Protocol Development Environment," Proceedings of IEEE Infocom'99, Mar. 1999, 9 pages.

Duffield, N.G., et al., "A Flexible Model for Resource Management in Virtual Private Networks," Computer Communication Review Conference, Computer Communication, ACM SIGCOMM '99 Conference, Cambridge, MA, Aug. 30-Sep. 3, 1999. pp. 95-108.

Campbell, A T. and Keshav, S., "Quality of Service in Distributed Systems," Computer Communications 21, 1998, pp. 291-293.

Bach, M. J., The Design of the Unix.RTM Operating System, New Delhi, Prentice-Hall of India, 1989, pp. v-x, 19-37.

McDougall, R., et al., Resource Management, Upper Saddle River, NJ, Prentice Hall, 1999, pp. iii-xix, 135-191.

Rijsinghani, A., RFC 1624, May 1994, [online], [retrieved Feb. 2, 2000], retrieved from the internet: <URL: http://www.faqs.org/rfcs/rfc1624.html>.

Mallory, T and Kulberg, A., RFC 1141, Jan. 1990 [online], [retrieved Feb. 2, 2000], retrieved from the Internet: <URL: http://www.faqs.org/rfcs/rfc1141.html>.

Egevang, K. and Francis P., RFC 1631, May 1994 [online], [retrieved Feb. 2, 2000], retrieved from the Internet: <URL: http://www.faqs.org/rfcs/rfc1631.html>.

Mitra, Debasis et al., "Hierarchical Virtual Partitioning: Algorithms for Virtual Private Networking," Bell Labs Technical Journal, Spring, 1997, http://cm.belllabs.com/cm/ms/who/mitra/papers/Qlobe.ps.

Berkeley Software Distribution, "man page: setpgid," Feb. 1, 1994, [Retrieved on Oct. 13, 2005], Retrieved from the Internet <URL:http://www.neosott.com/neosoft/man/setpgid.2.html>.

Berkeley Software Distribution, "man page: setsid", Feb. 1, 1994, [Retrieved on Oct. 13, 2005], Retrieved from the Internet <URL: http://www.neosott.com/neosoftlman/setsid.2.html>.

Frost, J., "UNIX Signals and Process Groups," Aug. 17, 1994, [Retrieved on Oct. 13, 2005], Retrieved from the Internet <URL:http://www.cs.ucsb.edu/about.almeroth/classes!W99.276/assignment1/signal- s.html>.

Stevens, Richard W., "Advanced Programming in the UNIX.RTM Environment," 1993, pp. 237-246, 282-285, Addison Wesley Longman, Inc., USA.

Symbol Table, [online] copyright 1997, 1998, [Retrieved on Apr. 4, 2003] Retrieved from the internet <URL: http://216.239.33.100/search?q=cache:eASXk8qC.sub.--- AC:www.caldera.com/developers/qabi/1998-04-29/ch4.s ...>, pp. 1-5.

United States Patent and Trademark Office, Non-Final Office Action, U.S. Appl. No. 12/025,723, mailed Dec. 12, 2008, 7 pages.

United States Patent and Trademark Office, Non-Final Office Action, U.S. Appl. No. 12/025,727, mailed Oct. 2, 2009, 4 pages.

United States Patent and Trademark Office, Notice of Allowance, U.S. Appl. No. 12/025,727, mailed Feb. 9, 2010, 4 pages.

United States Patent and Trademark Office, Restriction Requirement, U.S. Appl. No. 09/503,975, mailed Jun. 28, 2004, 6 pages.

United States Patent and Trademark Office, Non-Final Office Action, U.S. Appl. No. 09/503,975, mailed Jan. 26, 2005, 8 pages.

United States Patent and Trademark Office, Final Office Action, U.S. Appl. No. 09/503,975, mailed Jun. 6, 2005, 7 pages.

United States Patent and Trademark Office, Miscellaneous Action, U.S. Appl. No. 09/503,975, mailed Dec. 1, 2005, 3 pages.

United States Patent and Trademark Office, Non-Final Office Action, U.S. Appl. No. 09/503,975, mailed Nov. 3, 2006, 7 pages.

United States Patent and Trademark Office, Notice of Allowance, U.S. Appl. No. 09/503,975, mailed Oct. 16, 2007, 6 pages.

* cited by examiner

RESTRICTING COMMUNICATION OF SELECTED PROCESSES TO A SET OF SPECIFIC NETWORK ADDRESSES

CROSS-REFERENCES TO RELATED APPLICATIONS

This application is a continuation application of commonly assigned U.S. patent application Ser. No. 12/025,727, filed on Feb. 4, 2008, and entitled "RESTRICTING COMMUNICATION OF SELECTED PROCESSES TO A SET OF SPECIFIC NETWORK ADDRESSES," now U.S. Pat. No. 7,739,401, issued Jun. 15, 2010, which is a divisional application of U.S. patent application Ser. No. 09/503,975, filed on Feb. 14, 2000, and entitled "RESTRICTING COMMUNICATION OF SELECTED PROCESSES TO A SET OF SPECIFIC NETWORK ADDRESSES," now U.S. Pat. No. 7,343,421, issued Mar. 11, 2008, both of which are hereby incorporated herein in their entireties by reference.

TECHNICAL FIELD

The present invention relates generally to computer network communication by software processes, and specifically to restricting process communication to a set of specific network addresses.

BACKGROUND

With the popularity and success of the Internet, server technologies are of great commercial importance today. Typically, a single server program executes on a physical host computer, and services client requests made to the host. Most commonly, one network address is assigned to a physical host. However, using Transmission Control Protocol/Internet Protocol (TCP/IP) and other transport protocols, more than one network address can be assigned to a single physical host computer. Where a single network address is assigned to a physical host, the server program services client requests made to the single network address. Where multiple network addresses are assigned, the server program services client requests made to the multiple network addresses.

To service requests made to a host, a server program executing on the host typically opens a communication transport channel (socket) and allows receipt of incoming communications targeted for any of the network addresses assigned to the host. Accepting a communication request by a server executing TCP/IP is a three-step process that includes waiting for the communication request from a client, sending an acknowledgment signal to the client, and receiving a return acknowledgment signal from the client. This three-step process is called "three way handshaking," and is a feature of TCP/IP communication.

A server program is simply a process. Multitasking operating systems can execute multiple processes simultaneously, so it is technically possible for more than one server program to execute on a single physical host computer. The ability to execute multiple server programs on a single physical host is desirable, because providing a unique physical host for each server program is expensive and inefficient. Hosting services are often provided commercially by an Internet Service Provider (ISP). Absent the execution of multiple server programs on a single physical host, an ISP would have to provide a separate physical host computer for every customer that purchases host services. Often, a customer purchasing host services from an ISP will neither require nor be amenable to paying for use of an entire host computer. Generally, only a fraction of the processing power, storage, and other resources of a host computer will be required to meet the needs of an individual customer.

Execution of multiple server programs on a single host would allow an ISP to utilize one host computer to provide commercial host services to multiple customers. Each customer would be assigned a single server program, and would be provided with resources on the single, physical host computer, effectively sharing the host with other customers. A client computer would request data from a specific one of the servers by targeting communication requests to one of the network addresses of the host computer. Thus, the functionality of numerous hosts would be provided by a single physical host computer, servicing requests made to a plurality of server programs by multiple customers.

One problem that renders the execution of multiple servers on a single physical host commercially unviable today is the inability to restrict the communication of individual servers to a set of specific network addresses. There are two options by which a server program can register itself with the operating system to receive incoming communication requests. The first option is for a server to register itself to receive communication requests targeted to any of the network addresses of the physical host computer. A server program registered according to the first option receives communication requests arriving at all of the network addresses allocated to the host. Thus, multiple server programs so registered can execute simultaneously and service requests made to the network addresses associated with the physical host, but specific ones of the server programs can not be restricted to receiving and servicing requests made to specific ones of the network addresses allocated to the physical host. Thus, any request made by any client to any network address allocated to the physical host could be received by any one of the server programs executing on the host.

Commercially desirable server programs must be associated with specific network addresses. Each customer of an ISP wants their server to receive and respond only to requests made thereto. Furthermore, each customer wants only their server to receive its targeted requests. Customers could benefit from the lowered expense of executing multiple server programs on a single physical host, but of course would insist on privacy between the multiple servers.

Customers would not accept a system in which a request targeted to their server could be received by a server of another customer of the ISP. The other customer could be a competitor, and the request could comprise classified data. And of course, servers are not generally programmed to process requests intended for other servers, and thus requests received by another server could go unprocessed, or could be improperly processed. Even in the best case scenario in which a server could process a received request intended for another server, the processing server would be allocating resources, paid for by one customer of the ISP, to service a request made to another customer. Clearly, the execution on a single host of multiple server programs which are not associated with specific network addresses is totally unacceptable for commercial purposes.

The second option by which a server program can register itself with the operating system to receive incoming communication requests is for the process to register itself to receive communication requests targeted to an individual network address associated with the physical host. Server programs registered according to the second option receive communication requests arriving only at a specific individual network address of the host. Thus, multiple server programs so registered can execute simultaneously. Each server program receives and services requests made to a specific one of the network addresses associated with the physical host. However, each server is restricted to receiving and servicing requests made to only one of the network addresses allocated to the physical host. Thus, no server program can service requests made to multiple network addresses.

While it is desirable to be able to restrict a server program to communication via a specific set of network addresses, it is at the same time desirable to be able to include in the specific set more than one network address. Many existing server programs that execute on dedicated physicals hosts are configured to service communication requests made to multiple network addresses. This functionality is a popular feature with purchasers of commercial host services. Were an ISP to commercially offer multiple server programs executing on a single physical host computer, the customers would expect the servers to be able to communicate via multiple network addresses. Thus, it is desirable for an ISP to be able to provide, on a single physical host computer, multiple servers each of which can service requests made to multiple network address.

There is an additional security related problem that results from not being able to restrict server programs to communication via specific network addresses. Without a mechanism to restrict a process to accessing a specific set of network addresses, a server program could be written that intentionally receives or monitors communication requests made to another server executing on the same host. If a customer of an ISP or an unauthorized third party learned a network address associated with another customer's server, it would be possible for the unauthorized party to create a server program to receive or monitor, at a source code level, communication via that address. The risk of such activity would obviously be unacceptable to customers of ISP's. Of course, ISP's could examine the source code of all server programs to attempt to prevent such activity, but such checking would be time consuming and expensive. It would be desirable for a process executing on the host, external to every server program, to ensure that no server program communicate via any unauthorized network address.

It is also important to understand that many server programs are being provided today by ISP's and other providers of host services. As explained above, it would be desirable for existing ISP's to be able to provide multiple server programs on a single physical host. However, many such ISP's would not want to replace their existing server programs with ones that could overcome the problems associated with providing multiple servers on a single physical host, even if such servers were available. Upgrading server software is a time consuming and complicated process, often involving costly down time and high labor expenses. It would be desirable to have a system to allow existing providers of server programs to provide multiple server programs on a single physical host without having to upgrade or replace their existing server software.

In summary, what is needed is a method whereby a process can be restricted to communication via a set of specific, multiple network addresses. That way, ISP's could provide multiple, commercially viable server programs on a single physical host computer. Furthermore, the method should be external to server programs executing on a host, so that unauthorized servers and third parties can be prevented from monitoring communication of other server programs. Finally, the method should not require the replacement of existing server programs.

SUMMARY

The present invention allows the restriction of process communication to a specific set of network addresses. In order to facilitate such restriction, selected processes are associated with specific network addresses. Network address-based communication of the selected processes is restricted to the associated network addresses. Certain attempts by selected processes to facilitate or conduct communication via a network address are detected, including attempts to designate a network address to be used for subsequent communication. Only in response to a determination that the network address is associated with the process is the designation, and hence the subsequent communication, allowed to proceed. Also detected are attempts by selected processes to communicate without first designating a specific network address. Before such communication is allowed to proceed, an associated network address is designated for the communication.

Selected processes that are to be restricted to communication via a set of specific network address are loaded by a modified loader program. A loader program is an operating system utility that is used to execute computer programs that are stored on static media. Typically, a loader program loads an executable image from static media into process address space, and then initiates execution of the loaded image by transferring execution to the first instruction thereof.

Like a standard loader program, the modified loader of the present invention loads executable images from static media into process address space. Additionally, the modified loader associates each loaded processes with a specific set of network addresses. The set can comprise one or more network address. The loader program associates the process with the set of addresses by storing an association between a process identifier of the process and the set of network addresses. In one embodiment, the associations are stored in an association table. In other embodiments, the associations are stored in other data structures as desired, for example a linked list. The association table (or other data structure) is preferably stored in operating system address space, but can also be stored in user space as desired. Each process that is to be restricted to communication via a specific set of network addresses is loaded by the modified loader program in this manner.

The loader program also associates the process with a dedicated local host address. A local host address is an address that is used to conduct intra-computer communications between a server program and other processes running on the same physical computer. On a dedicated physical host computer, only one local host address is necessary because only a single server program executes on that computer. All intracomputer communication with the server program is conducted via the single local host address. In TCP/IP, the single local host address is 127.0.0.1. On every physical host running TCP/IP, this address is reserved for intra-computer TCP/IP communication. However, where multiple server programs (processes) execute on a single physical computer (or in any scenario in which intra-computer communication can be targeted to a plurality of processes), each such process must have its own local host address via which it can conduct intra-computer communication. If each server program utilized the same local host address, intra-computer communication targeted for any server program could be received by any other server program.

In order to ensure that all infra-computer communication is private, whenever the modified loader program loads a selected process, the modified loader associates the selected process with a dedicated local host address. This association is then stored by the loader program. The dedicated local host address is reserved for the exclusive utilization of the selected process. The process uses its dedicated local host address for the sole purpose of intra-computer communication. Once the associations have been stored, the loader program proceeds to initiate execution of the loaded process by transferring execution to the first instruction thereof.

The stored associations are used to restrict the communication of processes to associated network addresses. In order to keep the associations complete and current, the present invention intercepts system calls that create child processes, and system calls that delete processes. System calls that create child processes are intercepted in order to associate a child process with the network addresses of the parent process. System calls that delete processes are intercepted in order to delete an association between a deleted process and a set of network addresses.

When a system call that creates a child process is intercepted, an interception module examines the association table (or other data structure in which associations are stored) to determine if the parent process is associated with a set of network addresses. If so, the interception module allows the creation of the child process to proceed, and then updates the association table to include an association between the child process and the set of network addresses with which the parent process is associated. Communications of the child process are restricted to this set of network addresses. If the parent process is not associated with a set of network addresses, the interception module simply allows the creation of the child process to proceed normally.

When a system call that deletes a process is intercepted, the interception module examines the association table to determine if the process to be deleted is associated with a set of network addresses. If so, the interception module allows the deletion of the process to proceed, and then deletes the association in the table between the deleted process and the set of network addresses. If the process is not associated with a set of network addresses, the interception module allows the deletion of the process to proceed normally.

The present invention detects when a selected process is attempting to designate a network address for subsequent communication, and when a selected process is attempting to conduct network-address based communication that does not require the pre-designation of a network address. In order to so detect, preferably the Transmission Control Protocol/Internet Protocol (TCP/IP) stack of the operating system is modified so as to intercept certain communication protocol subroutines that are associated with network address-based communication. Modifying a communication protocol stack to intercept subroutines is similar to intercepting system calls. A communication protocol stack includes pointers to subroutines that perform various communication based tasks. The protocol stack is modified by replacing the pointers to certain subroutines that pertain to network address-based communication with pointers to the interception module, such that when the subroutines are called, the interception module executes instead. Examples of network address-based communication tasks performed by communication protocol stack subroutines include creating a communication channel, associating a communication channel with a network address, receiving data via a communication channel, and transmitting data via a communication channel.

When a network address-based communication subroutine is intercepted, the interception module examines the association table to determine whether the process that called the subroutine is associated with a set of network addresses (in other words, the interception module determines whether the process is selected). If a selected process is attempting to designate a network address for subsequent communication, the interception module ensures that the network address is associated with the process. If the network address is not associated with the process, the interception module generates an error condition, and does not allow the designation or subsequent communication to proceed. If a selected process is attempting to engage in network address based communication without designating a network address to be utilized for the communication, the interception module ensures that the communication is conducted via an associated address.

If a selected process is attempting to conduct network-address based communication that does not require the pre-designation of a network address, the interception module determines if a network address has been pre-designated. If not, the interception module designates an associated address. If an unassociated address has been designated, the interception module does not allow the communication to proceed, and instead generates an error condition. Thus, processes that are associated with a set of network addresses are restricted to executing network based communication via the associated set of addresses. Where the process that called the subroutine is not associated with a set of network addresses, the interception module allows the communication to proceed normally.

In an alternative embodiment of the present invention, rather than modifying a communications protocol stack, the present invention intercepts system calls that pertain to network address-based communication. Interception of these system calls achieves the same result as the modification of the communication protocol stack. A communication protocol stack is at a lower level than a system call. In fact, in order to request a communication task, a process typically makes a system call. The system call, in turn, calls the subroutine in the appropriate communication protocol stack. Thus, intercepting either the system call (higher level) or the subroutine (lower level) will generate the same result.

Because the present invention restricts network based communication of selected processes to a specific set of one or more network addresses, the present invention may be readily utilized by ISP's to provide multiple, commercially viable server programs executing on a on a single physical host computer.

It is to be understood that one desirable embodiment of the present invention operates externally to all other processes. The present invention detects when a process is attempting to designate a network address for subsequent communication, and when a process is attempting to conduct network-address based communication that does not require the pre-designation of a network address. If the process attempting the communication is associated with a set of network addresses, the communication is only allowed to proceed via an associated address. Therefore, the present invention can ensure that unauthorized server programs (processes) and third parties are prevented from monitoring communication of other server programs.

It is also to be understood that the present invention does not require that the source code of the selected processes be rewritten, or that the processes themselves be upgraded in any way. The present invention can restrict the communication of any process, including all existing processes. Therefore, the present invention can be used to restrict the network address-based communication of server programs without requiring that the server programs be rewritten or upgraded.

It will be readily apparent to one skilled in the art that the present invention can be utilized to restrict process communication of any type of process to a specific set of network addresses. Thus, although restricting network address-based communication of server programs is one important function of the present invention, the present invention is by no means so limited. For example, the present invention can also be utilized to restrict network address-based communication of client processes, communication daemons, device drivers, and the like. All such uses are, of course, within the scope of the present invention.

DETAILED DESCRIPTION

I. System Overview

Figure 1:
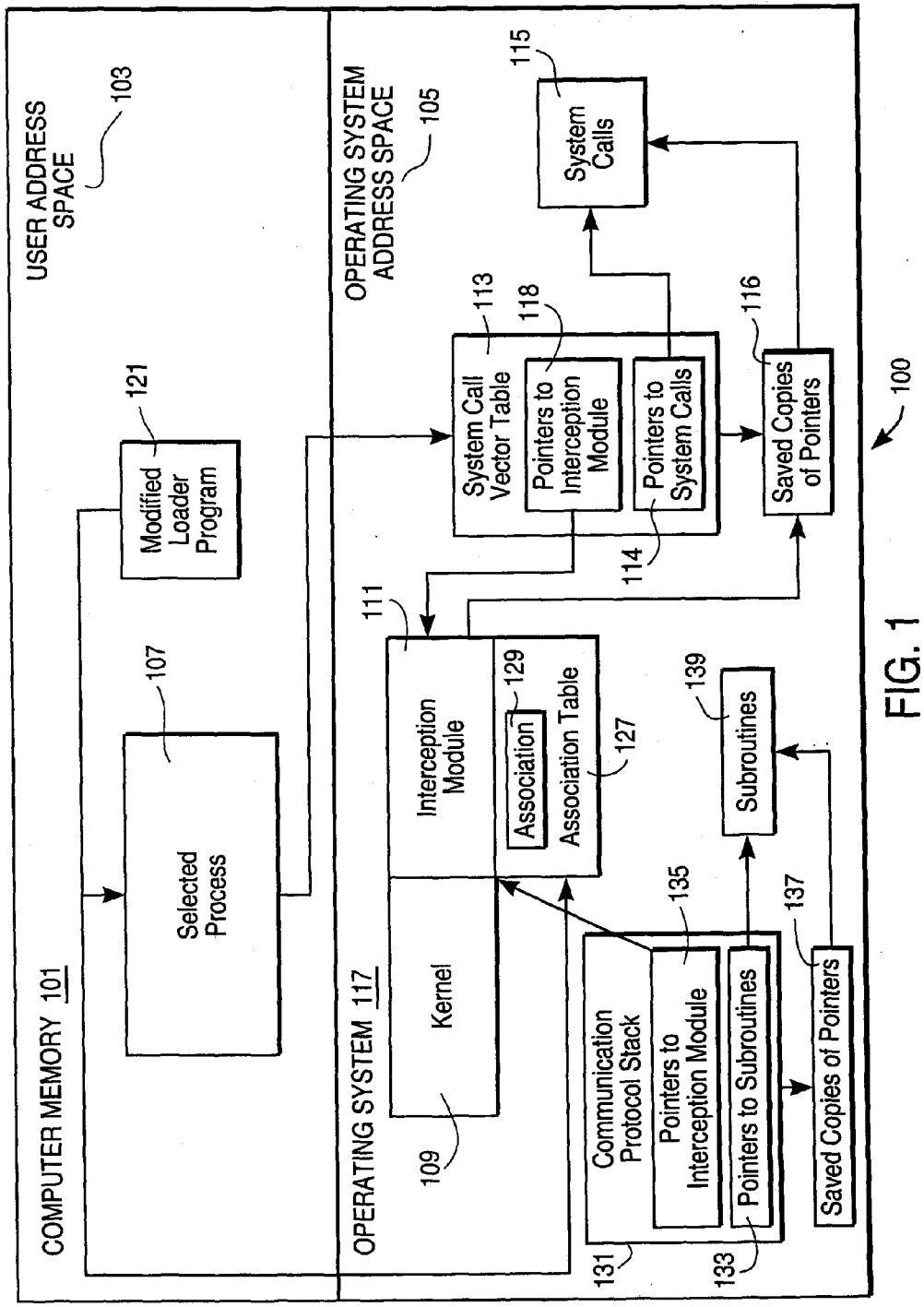
FIG. 1 is a block diagram illustrating a system for restricting process communication to a set of specific network addresses according to one embodiment of the present invention.

FIG. 1 illustrates a system 100 for restricting process communication to a set of specific network addresses according to one embodiment of the present invention. A computer memory 101 includes user address space 103 and operating system address space 105. A process 107 executes in user address space 103. Although FIG. 1 illustrates only a single process 107 executing in user address space 103, it is to be understood that within a given computer memory 101, multiple processes 107 can execute simultaneously. The computer memory 101 is preferably part of an otherwise conventional computer system, including at least one central processing unit, at least one static storage device, and input/output devices.

An operating system kernel 109 executes in operating system address space 105. Techniques known in the art are utilized to insert an interception module 111 into the operating system 117. In a preferred embodiment, an interception module is dynamically loaded 111 into the operating system kernel 109, while the kernel 109 is active. The interception module 111 is preferably in the form of object code, the functional features of which are described in detail below. Preferably, a single interception module 111 that includes all of the object code described below is loaded into the operating system kernel 109. In alternative embodiments, multiple interception modules 111 are loaded, each module 111 including a subset of the object code.

Also inserted into the operating system 117 is an association table 127, which will be used to store associations 129 between selected processes 107 and sets of network addresses. Preferably, the association table 127 is loaded into the operating system kernel 109, while the kernel 109 is active. In alternative embodiments, the associations are not loaded into the kernel 109, but are stored in user address space 103 or operating system address space 105 as desired. In alternative embodiments of the present invention, the associations 129 are stored in a format other than a table 127, for example a linked list.

Processes 107 that are selected to have their network address-based communication restricted to a set of specific network addresses are loaded into process address space 119 by a modified loader program 121. As explained above, a loader program is an operating system utility that is used to execute computer programs that are stored on static media. A loader program typically executes in user address space 103. When a user attempts to execute a computer program (for example by typing the name of an executable file at a command line, or by clicking on an icon associated with the program), the loader program executes and proceeds to load an executable image from static media into process address space 119, and then to initiate execution of the loaded image by transferring execution to the first instruction thereof.

The present invention utilizes a modified loader program 121 to load selected processes 107 that are to have their network-address based communication restricted to a set of specific network addresses. Like a standard loader program, the modified loader 121 loads executable images from static media into process address space 119. The modified loader program 121 proceeds to store, in the association table (or alternative data structure) an association 129 between the process identifier (or in alternative embodiments, alternative process identifying data such as process name) of the loaded process 107 and the set of specific network addresses for the process 107. Once the association 129 has been stored, the loader program 121 initiates execution of the process 107 by transferring execution to the first instruction thereof.

As stated above, only selected processes 107 are loaded by the modified loader program 121. Non-selected processes are loaded with the standard, default operating system loader program, which simply loads and executes the process. Thus, non-selected processes are not associated with sets of network addresses.

The loading of selected processes 107 and non-selected processes with two different loader programs is possible because multitasking operating systems such as UNIX® allow the use of multiple loader programs. The decision as to which processes 107 are to be loaded with the modified loader program 107 can be made by a system administrator, or by a user. A system administrator can limit access to the modified loader program 121, and thus limit the ability of users to specify which processes will be selected.

In an alternative embodiment of the present invention, a single, modified loader program 121 is utilized to load both selected processes 107 and non-selected processes. In that embodiment, a list of selected processes 107 is stored in computer memory 101. The list is preferably dynamic, and can be updated with additions or deletions as desired. The modified loader program 121 utilizes the list to determine if a process to be loaded is a selected process 107. If so, the modified loader program 121 loads the selected process 107, and stores the association 129, as described above. If the process is not selected, the modified loader 121 simply loads the process in the manner of a default loader program.

In order to restrict the communication of selected processes 107 to specific sets of network addresses, the present invention intercepts certain system calls 115. Pointers 114 to system calls 115 are located in an operating system interrupt vector table 113. It is to be understood that the term "interrupt vector table" as used herein denotes an area in operating system address space 105 in which there are stored the addresses of system calls. In the UNIX operating system, this part of the operating system is called the "interrupt vector table," and that term is used in this specification. Other operating systems employ different terminology to denote the same system component. An interrupt vector table by any other name is still within the scope of the present invention.

A copy 116 is made of a pointer 114 to each system call 115 to be intercepted. These copies 116 of pointers 114 are preferably stored in operating system address space 105, but in an alternative embodiments are stored in user address space 103. Once the copies 116 have been saved, the pointers 114 in the interrupt vector table 113 to the system calls 115 to be intercepted are replaced with pointers 118 to the interception module 111, such that when a system call 115 to be intercepted is made, the interception module 111 executes instead. In one embodiment of the present invention, this copying, storing, and replacing of pointers is performed by the interception model 111. In other embodiments, copying, storing, and replacing of pointers is performed by a pointer management module executing in either operating system address space 105 or user address space 103 as desired. The pointer management module can either be a stand alone program, or a component of a larger application program as desired.

Executing alternative code when a system call 115 is made comprises intercepting the system call 115. The steps of inserting an interception module 111 into the operating system 117, making a copy 116 of an operating system pointer 114 to a system call 115, and replacing the operating system pointer 114 with a pointer 118 to the interception module 111 facilitate interception of a system call 115. When a call is made to a system call 115 to be intercepted, the operating system 117 uses the pointer 118 in the interrupt vector table 113 to the interception module 111 to execute the interception module 111.

It is to be understood that the term "interception module" is used herein to denote alternative object code that executes in response to the making of a system call. The alternative object code that executes when a system call 115 is made is sometimes referred to as a "system call wrapper" as opposed to an "interception module." Of course, the execution of alternative object code in response to the making of a system call is within the scope of the present invention regardless of what the alternative object code is called.

It is to be understood that in the present invention, not all system calls 115 need be intercepted. Only pointers 114 to system calls 115 to be intercepted are replaced with pointers 118 to the interception module 111. Pointers 114 to system calls 115 which are not to be intercepted are not replaced. Thus, when a non-intercepted system call 115 is made, the system call 115 executes, not the interception module 111.

Additionally, in order to restrict the communication of selected processes 107 to specific sets of network addresses, a communication protocol stack 131 is modified so as to intercept certain communication subroutines 139. It is to be understood that the term "communication protocol stack" is used herein to denote the layers of software (e.g. transport layer, internetwork layer, hardware interface layer) that facilitate inter-computer and inter-process communication according to a specific protocol. The layers of software that make up a communication protocol stack 131 are typically stored in operating system address space 105. These layers of software are sometimes referred to by other names, for example "communication protocol suite." Of course, the present invention is not limited to any specific name.

A communication protocol stack 131 contains pointers 133 to subroutines 139 that perform various communication tasks. Non-exhaustive examples of such subroutines 139 include a subroutine that establishes a communication channel, a subroutine that binds a communication channel to a network address, and a subroutine that transmits data via a communication channel.

The present invention intercepts certain ones of these subroutines 139. To prepare to intercept subroutines 139, a copy 137 of a pointer 133 to each subroutine 139 to be intercepted is made. These copies 137 are preferably stored in operating system address space 105, but in an alternative embodiments are stored in user address space 103. Once the copies 137 have been made and saved, the pointers 133 in the communication protocol stack 131 to the subroutines 139 to be intercepted are replaced with pointers 135 to the interception module 111, such that when a subroutine 139 to be intercepted is called, the interception module 111 executes instead. In one embodiment of the present invention, the modification of the communication protocol stack 131, including the copying, storing, and replacing of pointers, is performed by the interception model 111. In other embodiments, the modification of the communication protocol stack 131 is performed by a communication protocol stack modification module executing in either operating system address space 105 or user address space 103 as desired. The pointer management module can either be a stand alone program, or a component of a larger application program as desired. In one embodiment, the communication protocol stack modification module is the same software module as the pointer management module.

Executing alternative code when a subroutine 139 is called comprises intercepting the subroutine 139. The steps of inserting an interception module 111 into the operating system 117, making a copy 137 of a communication protocol stack 131 pointer 133 to a subroutine 139, and replacing the communication protocol stack 131 pointer 133 with a pointer 135 to the interception module 111 facilitate interception of a subroutine 139. When a call is made to a subroutine 139 to be intercepted, the operating system 117 uses the pointer 135 in the communication protocol stack 131 to the interception module 111 to execute the interception module 111.

It is to be understood that in the present invention, not all subroutines 139 need be intercepted. Only pointers 133 to subroutines 139 to be intercepted are replaced with pointers 135 to the interception module 111. Pointers 133 to subroutines 139 that are not to be intercepted are not replaced. Thus, when a non-intercepted subroutine 139 is made, the subroutine 139 executes, not the interception module 111.

It is also to be understood that a single operating system 117 generally includes multiple communication protocol stacks 131, each protocol stack 139 facilitating communication according to a specific protocol. In one preferred embodiment of the present invention, the communication protocol stack 139 that is modified is the Transport Control Protocol (TCP/IP) stack 139. Other embodiments modify other protocol stacks 139 of other communication protocols as desired, for example User Data Protocol (UDP) or Internet Control Message Protocol (ICMP).

II. Restricting Communication of Selected Processes to Single Network Addresses

Figure 2A:
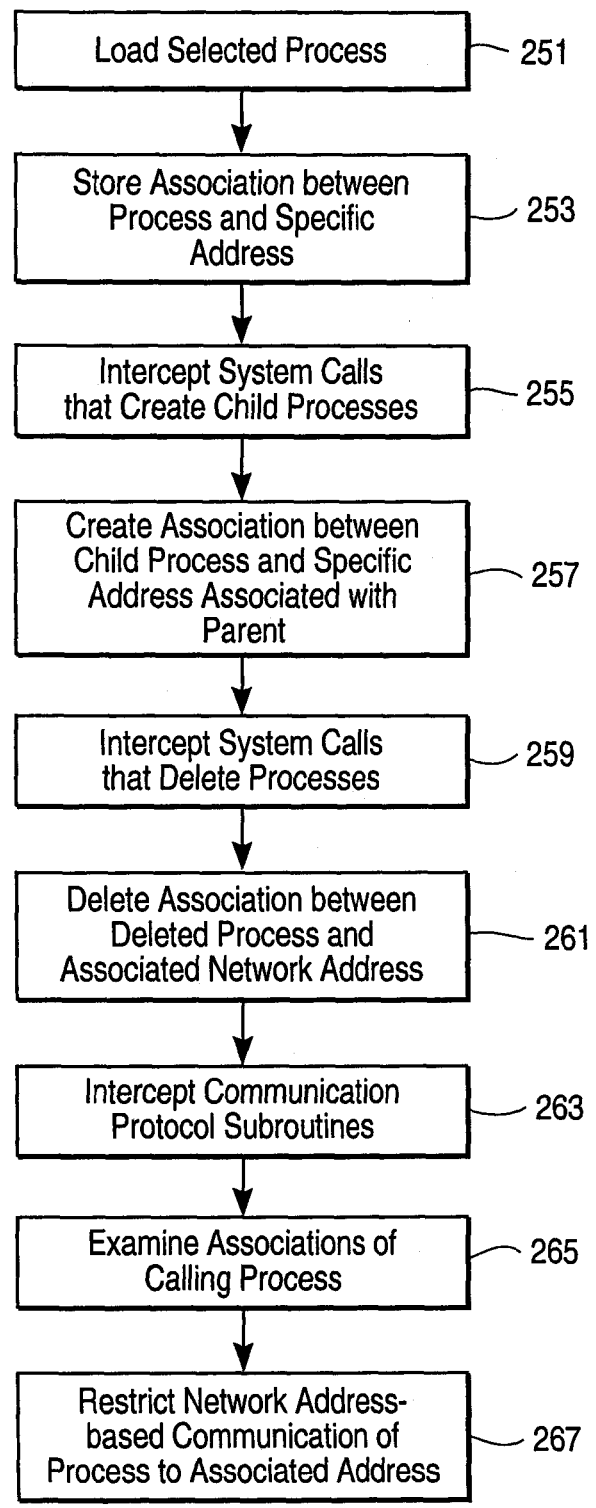
FIG. 2A is a high level flowchart illustrating the steps performed in order to restrict communication of selected processes to single network addresses, according to one embodiment of the present invention.

FIG. 2A illustrates the steps performed in order to restrict communication of selected processes 107 to single network addresses, according to one embodiment of the present invention. The modified loader program 121 loads 251 selected processes 107. For each selected process 107, the modified loader 121 stores 253 an association 201 between the process 107 and a specific network address via which the process 107 is permitted to communicate. In order to keep the associations 201 complete and current, system calls 115 that create child processes 107 and system calls 115 that delete processes 107 are intercepted 255, 259. If a selected process 107 creates a child process 107, an association 201 is created 257 between the child process 107 and the network address via which the parent process 107 is permitted to communicate. If a selected process 107 is deleted, the association 201 between the deleted process 107 and a network address is also deleted 261. The stored associations 201 are then utilized to restrict the selected processes 107 to communication via their associated specific network addresses. Certain network address-based communication protocol subroutines 139 are intercepted 263 in order to detect attempts by selected processes 107 to designate a network address for subsequent communication, and to detect attempts to communicate without having designated a specific network address. When such attempts are detected, the associations 201 are examined 265, and the selected processes 107 are restricted 267 to communication via their associated addresses.

Figure 2B:
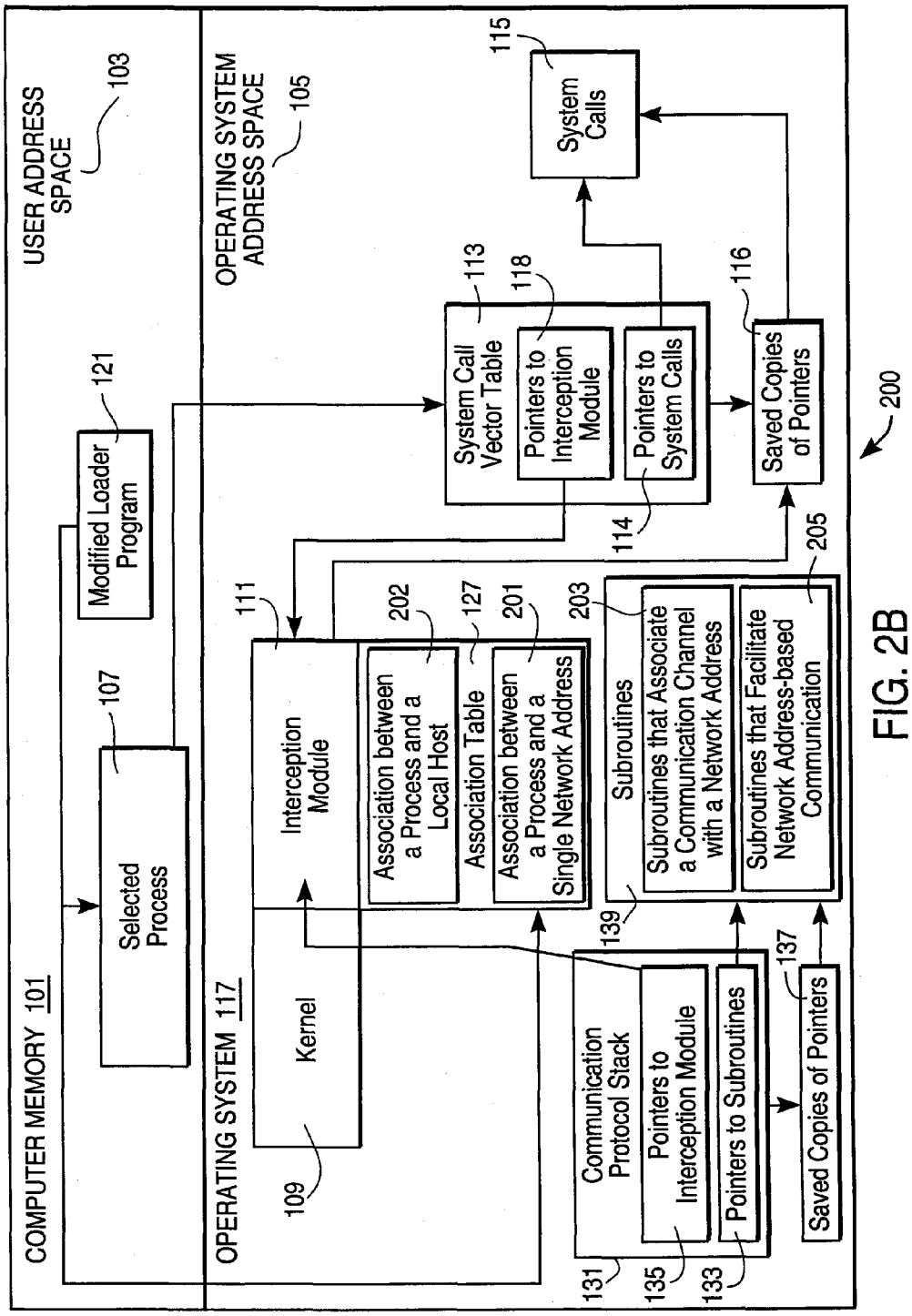
FIG. 2B is a block diagram illustrating a system for restricting communication of selected processes to single network addresses, according to the embodiment of the present invention depicted in FIG. 2A.

FIG. 2B illustrates a system 200 for restricting communication of selected processes 107 to single network addresses, according to the embodiment of the present invention illustrated in FIG. 2A. In the embodiment depicted in FIG. 2A and FIG. 2B, each selected process 107 is restricted to network address-based communication via a single associated address.

a. Loading a Selected Process

Each selected process 107 is loaded into user address space 103 by the modified loader program 121. For each selected process 107, the modified loader stores, in the association table 127, an association 201 between the process and a single, specific network address. The selected process 107 will be restricted to the use of this network address for all network address-based communication. Additionally, the loader program stores an association 202 between the process 107 and a dedicated local host address. The dedicated local host address is associated only with the selected process 107, and only for intra-computer communication. Recall that on a dedicated physical host computer, only one local host address is necessary because only a single server program executes on that computer. All intra-computer communication with the server can be conducted via the single local host address. However, where multiple server programs (processes 107) execute on a single physical computer (or in any application where intracomputer communication can be targeted to a plurality of processes 107), each such process 107 must have its own local host address via which it can conduct intra-computer communication. Thus, in the embodiment depicted in FIG. 2A and FIG. 2B, each selected process 107 is associated with a single, dedicated local host address via which the process 107 can conduct intra-computer communication, in addition to being associated with a single, specific network addresses via which the process 107 can conduct inter-computer communication.

b. Intercepting System Calls

In the embodiment depicted in FIG. 2A and FIG. 2B, all system calls 115 that establish a child process are intercepted (for example, the UNIX® spawn function). If a process 107 is restricted to communication via a single network address, it is necessary to so restrict all child processes 107 created by the process 107. Otherwise, a process 107 could effectively communicate via a non-associated network address by creating a child process 107, and instructing the child process to communicate via the non-associated network address. In order to restrict all progeny of selected processes 107, all system calls 115 that establish a child process are intercepted.

When a system call 115 that establishes a child process is made, the operating system 117 uses the pointer 118 in the interrupt vector table 113 to execute the interception module 111. The interception module 111 examines the association table 127 to determine whether the process 107 that is attempting to establish a child process is associated with a network address. If so, the interception module 111 first utilizes the saved copy of the pointer 116 to the system call 303 to make the system call 303. The system call 303 establishes the child process 107 (in an alternative embodiment, the interception module 111 establishes the child process 107 itself, rather than making the system call 115). When the system call 303 terminates, the interception module 111 stores, in the association table 127, an association 201 between the child process 107 and the single, network address with which the parent process 107 is associated. The child process 107 will then be restricted to network address based communication via this associated network address. The interception module 111 also stores, in the association table 127, an association 202 between the child process 107 and the local host address with which the parent process 107 is associated. The child process 107 will then be restricted to intra-computer communication via the associated local host address. If the process 107 that is attempting to establish a child process 107 is not associated with a network address, the interception module 111 simply makes the system call 115 such that execution control returns to the calling process 107 after the system call 115 executes.

In order to keep the association table 127 current, the present invention also intercepts system calls 115 that delete (terminate) a process 107 (for example, the UNIX® exit function). Whenever a process 107 makes a system call 1.15 to delete a process 107, the interception module 111 executes instead. The interception module 111 examines the association table 127 to determine whether the process 107 to be deleted is associated with a network address. If so, the interception module 111 utilizes the copy of the pointer 116 to execute the system call 115. The system call 115 deletes the process 107 (in an alternative embodiment, the interception module 111 deletes process 107 itself, rather than making the system call 115). When the system call 115 exits, the interception module 111 continues to execute, and deletes the association 201 in the association table 127 between the deleted process 107 and the network address. The interception module 111 also deletes the association 202 between the deleted process 107 and its dedicated local host address. This is appropriate, because the process 107 no longer exists. If the process 107 to be deleted is not associated with a network address, the interception module 111 simply makes the system call 115 such that execution control returns to the calling process 107 after the system call 115 executes.

c. Maintaining a Complete Association Table

Every selected process 107 is loaded by the modified loader program 121, which stores an association between the process 107 and the single network address via which the process 107 is permitted to communicate. Every system call 115 that establishes a child process 107 is intercepted. If a selected process 107 establishes a child process 107, an association 201 between the child process 107 and the associated network address of the parent process 107 is stored. Additionally, every system call 115 that deletes a process 107 is intercepted. If a deleted process 107 is associated with a network address, the association 201 is deleted. Thus, the association table 127 includes an association 201 between every selected process 107 and the single network address via which the selected process 107 is permitted to communicate. Because the association table 127 includes an association 201 for every selected process, the association table 127 can be utilized to determine whether or not a specific process 107 is selected, and if so to restrict the communication of that process to the associated network address.

d. Detecting Attempted Communication

Network address-based communication of selected processes 107 is restricted to the associated network addresses. In order to restrict selected processes 107 to communication via associated addresses, certain attempts by processes 107 to facilitate network address-based communication, and certain attempts by processes 107 to communicate via a network address are detected. Specifically detected are attempts by processes 107 to designate a network address for subsequent communication, and attempts by processes 107 to communicate without first designating a specific network address. When such attempts are detected, the association table 127 is examined to determine whether the process 107 is a selected process 107. If so, it is ensured that all communication is via an associated address.

i. Attempts to Designate a Network Address for Communication

In order to detect when a process 107 attempts to designate a network address for subsequent communication, the present invention intercepts certain communication protocol subroutines 139 that facilitate network address-based communication. Specifically, the present invention intercepts subroutines 203 that associate a communication channel with a network address (for example, the TCP/IP bind function). Under TCP/IP and other communication protocols, many communication functions can not be executed until a process 107 has first associated a communication channel with a network address via which the communication is to occur. If a process 107 attempts to utilize such a function to communicate via a network address without first having associated a communication channel with the network address, the function will not execute the communication, but will instead generate an error. By intercepting subroutines 203 that associate a communication channel with a network address, the present invention can ensure that no selected process 107 associates a communication channel with a non-associated network address. This further ensures that no selected process 107 communicates via a non-associated network address by utilizing a communication function that requires that a communication channel be associated with the network address.

It is to be understood that by the term "communication channel" it is meant a logical interface via which communication can be conducted. A communication channel is typically although not necessarily associated with both a network address and a port. Typically, separate communication channels must be present at each end of a communication session. A communication channel is sometimes denoted by the term "communication channel end" or the term "communication channel end point." Communication channels include but are not limited to TCP/IP sockets. In other words, all TCP/IP sockets are communication channels, but not all communication channels are TCP/IP sockets.

In order to intercept subroutines 203 that associate a communication channel with a network address, a communication protocol stack 131 is modified so as to intercept these subroutines 203. In one preferred embodiment, the TCP/IP stack is modified. In other embodiments, the protocol stacks of communication protocols are modified as desired. Regardless, the communication protocol stack 131 to be modified contains at least one pointer 133 to at least one subroutine 203 that associates a communication channel with a network address. The present invention intercepts such subroutines 203. When a process 107 calls a subroutine 203 to associate a communication channel with a network address, the operating system 117 uses the pointer 118 in the communication protocol stack 131 to execute the interception module 111. The interception module 111 examines the association table 127 to determine whether the process 107 that is attempting to associate a communication channel with a network address is a selected process (in other words, a determination is made as to whether the process 107 is associated with a specific address). If the process 107 is not associated with a network address, the interception module 111 simply calls the subroutine 203 such that execution control returns to the calling process 107 after the subroutine 203 executes.

If the process 107 is selected, the interception module 111 examines the association table to determine whether the network address that the process 107 is attempting to associate a communication channel with is associated with the process 107. If the address is associated with the process 107, then the process 107 is permitted to communicate via the network address. In this case, the interception module 111 calls the subroutine 203. The subroutine 203 associates the communication channel with the network address to allow future communication via the network address by the process 107 that called the subroutine 203. Execution control then returns to the calling process 107 after the subroutine 203 executes. In an alternative embodiment, rather than calling the subroutine 203 the interception module 111 associates the communication channel with the network address associated with the process 107, and then returns execution control to the calling process 107.

If the network address that the process 107 is attempting to associate a communication channel with is not associated with the process 107, another possibility is that the process 107 is attempting to associate a communication channel with the local host network address. If the address the process 107 is attempting to associate a communication channel with is the local host address of the physical host computer (for example, under TCP/IP 127.0.0.1), the interception module 111 associates the communication with the dedicated local host address of the process 107, and then returns execution control to the calling process 107. The process 107 can proceed to conduct intra-computer communication via its dedicated local host address. If the address the process 107 is attempting to associate a communication channel with the dedicated local host address of the process 107, the interception module 111 calls the subroutine 203. The subroutine 203 associates the communication channel with the dedicated local host address to allow future intra-computer communication via the dedicated local host address by the process 107 that called the subroutine 203. Execution control then returns to the calling process 107 after the subroutine 203 executes. In an alternative embodiment, rather than calling the subroutine 203 the interception module 111 associates the communication channel with the dedicated local host address of the process 107, and then returns execution control to the calling process 107.

If the network address that the process 107 is attempting to associate a communication channel with is not associated with the process 107 and is not a local host address, yet another possibility is that the process 107 is attempting to associate a communication channel with a wildcard network address. It is possible for a process 107 to call a subroutine 203 that associates a communication channel with a network address, and pass the subroutine 203 a wildcard as the parameter that indicates the network address. Under TCP/IP, a wildcard is indicated by passing the value 0 (typically represented by a constant such as "INADDR_ANY") as a parameter. Passing a wildcard constitutes a request that the communication channel be automatically associated with a network address. Typically, the communication channel is associated with the target network address of the next incoming communication request. This could be any network address associated with the physical host. Because the selected process 107 is restricted to communication via the associated network address, association of the communication channel with any address associated with the physical host is not permitted. Therefore, when the interception module 111 detects that a selected process 107 is attempting to associate a communication channel with a wild card network address, the interception module 111 associates the communication channel with the network address with which the process is associated. The process 107 is only permitted to conduct inter-computer communication via the single associated network address. Thus, when the process 107 requests that a communication channel be automatically associated with a network address, the interception module 111 associates the communication channel with the network address with which the process 107 is associated. After associating the communication channel with the network address, the interception module 111 returns execution control to the calling process 107.

If the process 107 is attempting to associate a communication channel with any network address other than the network address with which the process is associated, a local host address, or a wildcard address, the interception module 111 generates an error condition. In one embodiment, the interception module 111 generates an error condition by throwing an exception. In another embodiment, the interception module 111 generates an error condition by returning an error code to the process 107 that called the subroutine 203. Regardless, the process 107 is unable to communicated via the unassociated network address.

ii. Attempts to Communicate without Having Designated an Address

In order to detect when a process 107 attempts network address based communication without having first designated a network address, the present invention also intercepts subroutines 205 that facilitate network address-based communication without requiring that a communication channel first be associated with a network address. Certain subroutines allow network addressed-based communication without requiring that the process 107 first associate a communication channel with a network address. Non-exhaustive examples of such subroutines 205 include the TCP/IP connect function, sendto function, and sendmessage function. The connect function attempts to establish a connection between a local communication channel and a remote computer. The sendto and sendmessage functions attempt to transmit data (send packets) to a remote computer. These are only examples of subroutines 205 that facilitate network address-based communication without requiring that a communication channel first be associated with a network address. Of course, the present invention is not limited in scope to these specific examples.

Generally, subroutines 205 that facilitate network address-based communication without requiring that the process 107 first associate a communication channel with a network address do require that the calling process 107 specify a communication channel. If the specified communication channel has already been associated with a network address, subsequent communication will be conducted via that address. However, if the communication channel has not already been associated with a network address, the communication channel is automatically associated with a randomly chosen network address that is available for inter-computer communication. This could be any network address associated with the physical host. Because the selected process 107 is restricted to communication via a single, specific network address, association of the communication channel with a randomly selected network address associated with the physical host is not acceptable. To prevent this unacceptable random association, the present invention intercepts subroutines 205 that facilitate network address-based communication without requiring that a communication channel first be associated with a network address.

The communication protocol stack 131 is modified so as to intercept subroutines 205 that facilitate network address-based communication without requiring that a communication channel first be associated with a network address. When a process 107 calls a subroutine 205 that that facilitates network address-based communication without requiring that a communication channel first be associated with a network address, the operating system 117 uses the pointer 118 in the communication protocol stack 131 to execute the interception module 111. The interception module 111 examines the association table 127 to determine whether the process 107 that called the subroutine 205 is a selected process. If the process 107 is not associated with a network address, the interception module 111 simply calls the subroutine 205 such that execution control returns to the calling process 107 after the subroutine 205 executes.

If the process 107 is selected, the interception module 111 first determines whether or not the communication channel that was passed to the subroutine 205 is already associated with a network address. If the communication channel is not already associated with a network address, the interception module 111 associates the communication channel with the network address via which the process 107 is permitted to communicate. The interception module 111 calls the subroutine 205, which facilitates the network address-based communication by the process 107 (alternatively the interception module 111 facilitates the network address-based communication by the process 107 itself, as opposed to calling the subroutine 205). The communication channel has now been associated with the network address via which the process 107 is permitted to communicate. Therefore, the subsequent network address-based communication facilitated by the subroutine 205 (or interception module 111) will be via this permitted network address.

If the communication channel is already associated with a network address, the interception module 111 determines whether or not that network address is the network address via which the process 107 is permitted to communicate. If the network address with which the communication channel is associated is the network address via which the process 107 is permitted to communicate, the interception module 111 calls the subroutine 205. The subroutine 205 facilitates the network address-based communication via the network address (alternatively, the interception module 111 facilitates the network address-based communication itself, as opposed to calling the subroutine 205). Execution control then returns to the calling process 107.

If the network address with which the communication channel is associated is not the network address via which the process 107 is permitted to communicate, the interception module 111 generates an error condition. In one embodiment, the interception module 111 generates an error condition by throwing an exception. In another embodiment, the interception module 111 generates an error condition by returning an error code to the process 107 that called the subroutine 205. Regardless, the process 107 is unable to communicated via the unassociated network address.

Figure 3A:
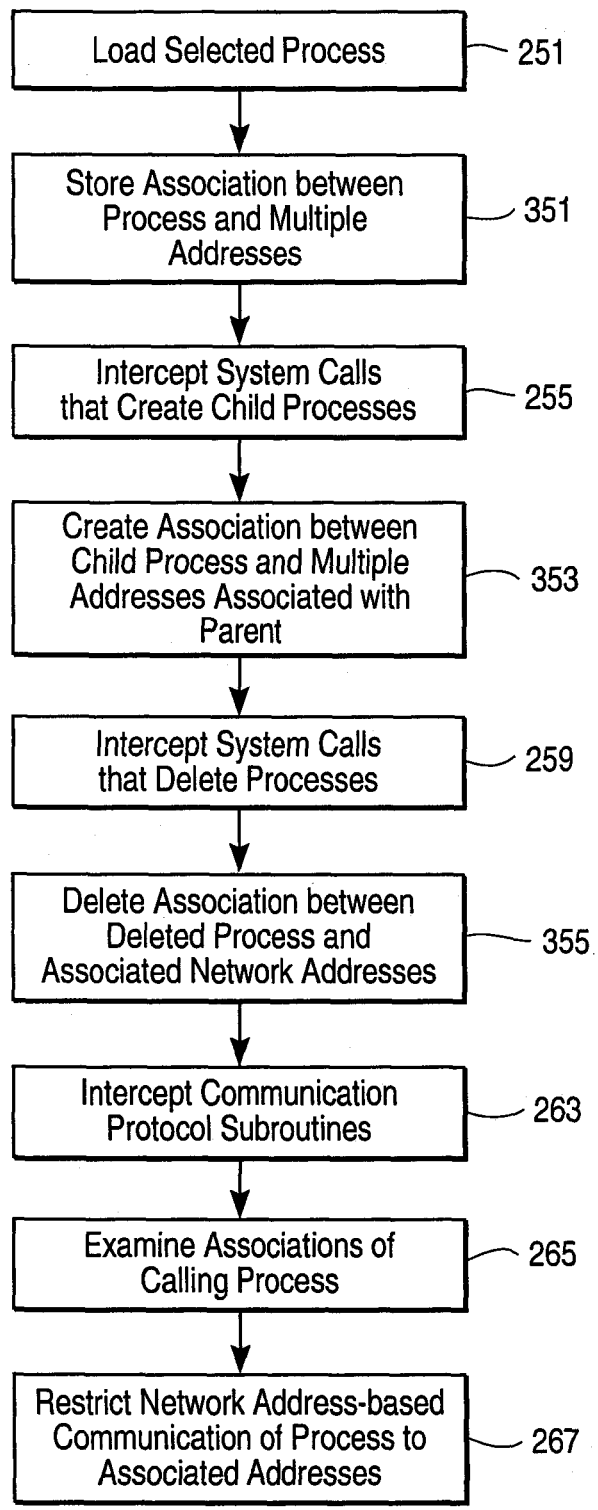
FIG. 3A is a high level flowchart illustrating the steps performed in order to restrict communication of selected processes to a set of specific, multiple addresses, according to another embodiment of the present invention.

III. Restricting Communication of Selected Processes to Specific, Multiple Network Address FIG. 3A illustrates the steps performed in order to restrict communication of selected processes to a set of specific, multiple addresses, according to another embodiment of the present invention. The modified loader program 121 loads 251 selected processes 107. For each selected process 107, the modified loader 121 stores 351 an association 301 between the process 107 and a set of network addresses via which the process 107 is permitted to communicate. In order to keep the associations complete and current, system calls 115 that create child processes 107 and system calls 115 that delete processes 107 are intercepted 255, 259. If a selected process 107 creates a child process 107, an association 301 is created 353 between the child process 107 and the set of network addresses via which the parent process 107 is permitted to communicate. If a selected process 107 is deleted, the association 301 between the deleted process 107 and a set of network addresses is also deleted 355. The stored associations 301 are then utilized to restrict the selected processes 107 to communication via their associated sets of specific network addresses. Certain network address-based communication protocol subroutines 139 are intercepted 263 in order to detect attempts by selected processes 107 to designate a network address for subsequent communication, and to detect attempts to communicate without having first designated a specific network address. When such attempts are detected, the associations 301 are examined 265, and the selected processes 107 are restricted 267 to communication via the associated addresses.

a. Loading a Selected Process

Figure 3B:
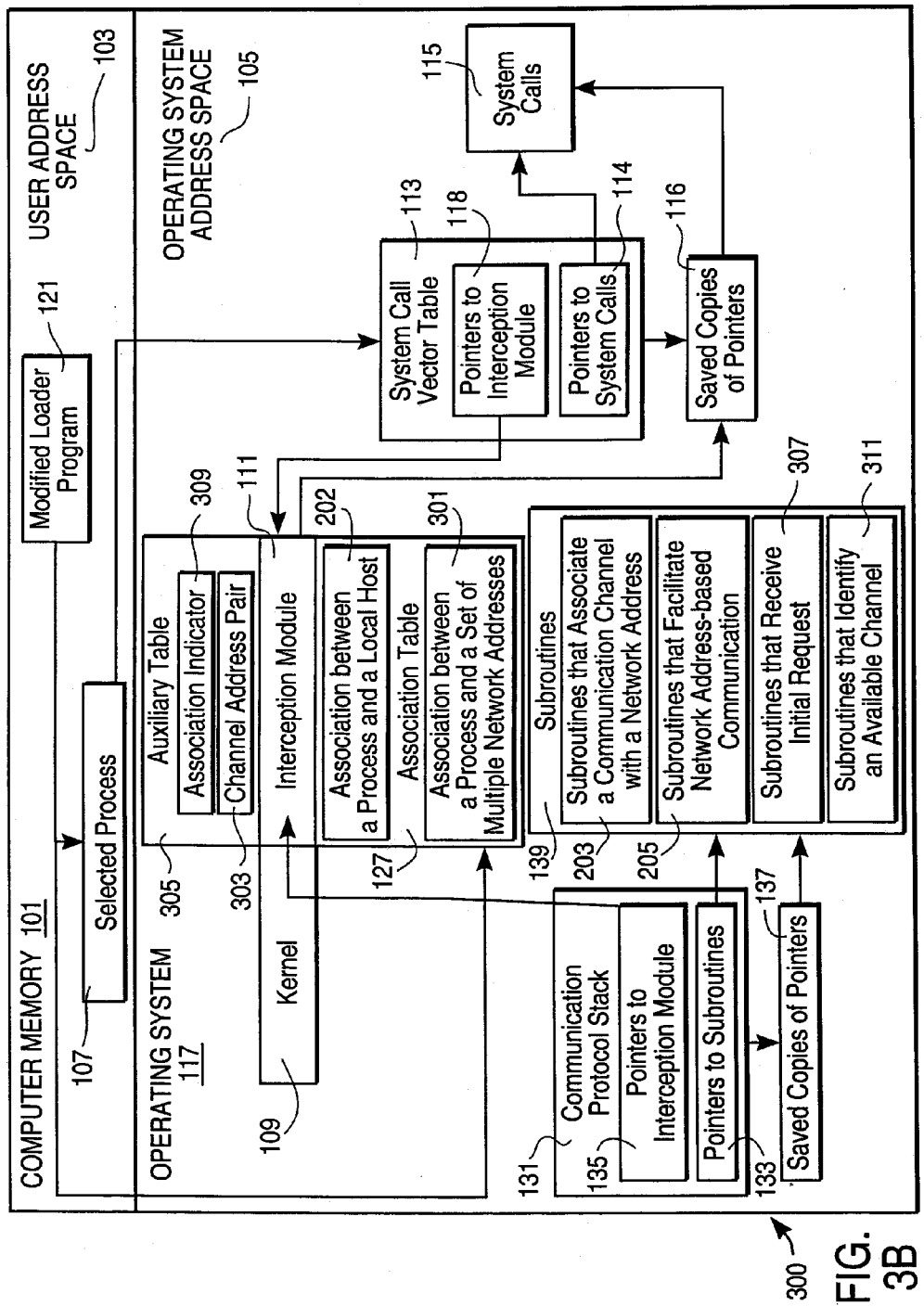
FIG. 3B is a block diagram illustrating a system for restricting communication of selected processes to a set of specific, multiple addresses, according to the embodiment of the present invention depicted in FIG. 3A.

FIG. 3B illustrates a system 300 for restricting communication of selected processes to a set of specific, multiple addresses, according to another embodiment of the present invention. In the embodiment depicted in FIG. 3A and FIG. 3B, each selected process 107 is loaded into user address space 103 by the modified loader program 121. For each selected process 107, the modified loader stores, in the association table 127, an association 301 between the process and a set of specific, multiple network address. The selected process 107 will be restricted to the use of this set of network addresses for all network address-based communication. The loader program also stores an association 202 between the process 107 and a dedicated local host address, as in the embodiment depicted in FIG. 2A and FIG. 2B. Thus, in the embodiment depicted in FIG. 3A and FIG. 3B, each selected process 107 is associated with a single, dedicated local host address via which the process 107 can conduct intra-computer communication, in addition to being associated with a set of specific, multiple network addresses via which the process 107 can conduct inter-computer communication.

b. Intercepting System Calls

As in the embodiment depicted in FIG. 2A and FIG. 2B, in the embodiment depicted in FIG. 3A and FIG. 3B all system calls 115 that establish a child process are intercepted. When a system call 115 that establishes a child process is made, the operating system 117 uses the pointer 118 in the interrupt vector table 113 to execute the interception module 111. The interception module 111 examines the association table 127 to determine whether the process 107 that is attempting to establish a child process is associated with a set of network addresses. If so, the interception module 111 first utilizes the saved copy of the pointer 116 to the system call 303 to make the system call 303. The system call 303 executes, thereby establishing the child process 107.

When the system call 303 terminates, the interception module 111 continues to execute. The interception module 111 stores, in the association table 127, an association 301 between the child process 107 and the set of specific, multiple network address with which the parent process 107 is associated. The child process 107 will then be restricted to network address based communication via this set of associated network addresses. The interception module 111 also stores, in the association table 127, an association 202 between the child process 107 and the local host address with which the parent process 107 is associated. The child process 107 will then be restricted to intra-computer communication via the associated local host address. If the process 107 that is attempting to establish a child process 107 is not associated with a network address, the interception module 111 simply makes the system call 115 such that execution control returns to the calling process 107 after the system call 115 executes.

As in the embodiment depicted in FIG. 2A and FIG. 2B, in order to keep the association table 127 current, in the embodiment depicted in FIG. 3A and FIG. 3B system calls 115 that delete a process 107 are also intercepted. Whenever a process 107 makes a system call 115 to delete a process 107, the interception module 111 executes instead. The interception module 111 examines the association table 127 to determine whether the process 107 to be deleted is associated with a network address. If so, the interception module 111 utilizes the copy of the pointer 116 to execute the system call 115. The system call 115 executes and deletes the process 107. When the system call 115 exits, the interception module 111 continues to execute. The interception module 111 deletes the association 301 in the association table 127 between the deleted process 107 and the set of network addresses. The interception module 111 also deletes the association 202 between the deleted process 107 and its dedicated local host address. If the process 107 to be deleted is not associated with a network address, the interception module 111 simply makes the system call 115 such that execution control returns to the calling process 107 after the system call 115 executes.

c. Maintaining a Complete Association Table

Every selected process 107 is loaded by the modified loader program 121, which stores an association 301 between the process 107 and a set of specific, multiple network addresses via which the process 107 is permitted to communicate. Every system call 115 that establishes a child process 107 is intercepted. If a selected process 107 establishes a child process 107, an association 301 between the child process 107 and the associated set of network addresses of the parent process 107 is stored. Additionally, every system call 115 that deletes a process 107 is intercepted. If a deleted process 107 is associated with a set of network addresses, the association 301 is deleted. Thus, the association table 127 includes an association 301 between every selected process 107 and the set of specific, multiple network addresses via which the selected process 107 is permitted to communicate. Because the association table 127 includes an association 301 for every selected process, the association table 127 can be utilized to determine whether or not a specific process 107 is selected, and if so to restrict the communication of that process to the associated set of network addresses.

d. Detecting Attempted Communication

Network address-based communication of the selected processes is restricted to the associated network addresses. In order to restrict selected processes 107 to communication via associated addresses, certain attempts by processes 107 to facilitate network address-based communication, and certain attempts by processes 107 to communicate via a network address are detected. Specifically detected are attempts by processes 107 to designate a network address for subsequent communication, and attempts by processes 107 to communicate without first designating a specific network address. When such attempts are detected, the association table 127 is examined to determine whether the process 107 is a selected process 107. If so, it is ensured that all communication is via an associated address.

i. Attempts to Designate a Network Address for Communication

In order to detect when a process 107 attempts to designate a network address for subsequent communication, the present invention intercepts certain communication protocol subroutines 139 that facilitate network address-based communication. Specifically, as in the embodiment depicted in FIG. 2A and FIG. 2B, in the embodiment depicted in FIG. 3A and FIG. 3B subroutines 203 that associate a communication channel with a network address are intercepted.

When a process 107 calls a subroutine 203 to associate a communication channel with a network address, the operating system 117 uses the pointer 118 in the communication protocol stack 131 to execute the interception module 111. The interception module 111 examines the association table 127 to determine whether the process 107 that is attempting to associate a communication channel with a network address is a selected process. If the process 107 is not associated with a set of network addresses, the interception module 111 simply calls the subroutine 203 such that execution control returns to the calling process 107 after the subroutine 203 executes.

If the process 107 is selected, the interception module 111 examines the association table 127 to determine whether the network address that the process 107 is attempting to associate a communication channel with is one of the addresses in the set associated with the process 107. If the address is in the set, then the process 107 is permitted to communicate via the network address. In this case, the interception module 111 calls the subroutine 203. The subroutine 203 associates the communication channel with the network address to allow future communication via the network address by the process 107 that called the subroutine 203. Execution control then returns to the calling process 107 after the subroutine 203 executes.

If the network address that the process 107 is attempting to associate a communication channel with is not in the set associated with the process 107, another possibility is that the process 107 is attempting to associate a communication channel with the local host network address. The embodiment depicted in FIG. 3A and FIG. 3B processes such an attempt in the manner of the embodiment depicted in FIG. 2A and FIG. 2B.

If the network address that the process 107 is attempting to associate a communication channel with is not associated with the process 107 and is not a local host address, yet another possibility is that the process 107 is attempting to associate a communication channel with a wildcard network address. Recall that passing a wildcard to a subroutine 203 that associates a communication channel with a network address constitutes a request to associate a communication channel with any network address available for network address-based communication. Because the process 107 is permitted to conduct network address-based communication via a set of multiple network addresses, each multiple network address of the set is available for network address-based communication. Therefore, it is desirable to associate a communication channel with each of the network address of the set. Thus, when a process 107 attempts to associate a communication channel with a wild card network address, the interception module 111 first associates the communication channel with one of the network addresses in the set. Next, the interception module 111 creates a communication channel (socket) for each remaining network address in the set, and proceeds to associate each created communication channel with one of the remaining network addresses. The result is that for each network address in the set, there exists a separate, associated communication channel. The resulting communication channel-network address pairs 303 are then stored, preferably in an auxiliary table 305, but alternatively in other data structures as desired. The stored communication channel-network address pairs 303 are then available to the process 107 for subsequent network address-based communication. Also stored (preferably in the auxiliary table 305) is an indicator 309 that the set of communication channel-network address pairs 303 associated with the previously existing communication channel that the process attempted to associate with a wild card network address. The purpose of this indicator 309 is explained below.

If the process 107 is attempting to associate a communication channel with any network address other than a network address with which the process 107 is associated, a local host address, or a wildcard address, the interception module 111 generates an error condition. In one embodiment, the interception module 111 generates an error condition by throwing an exception. In another embodiment, the interception module 111 generates an error condition by returning an error code to the process 107 that called the subroutine 203. Regardless, the process 107 is unable to communicated via the unassociated network address.

ii. Attempts to Communicate without Having Designated an Address

As in the embodiment depicted in FIG. 2A and FIG. 2B, in order to detect when a process 107 attempts network address based communication without having designated a network address, subroutines 205 that facilitate network address-based communication without requiring that a communication channel first be associated with a network address are also intercepted. When a process 107 calls a subroutine 205 that facilitates network address-based communication without requiring that a communication channel first be associated with a network address, the operating system 117 uses the pointer 118 in the communication protocol stack 131 to execute the interception module 111. The interception module 111 examines the association table 127 to determine whether the process 107 that called the subroutine is a selected process. If the process 107 is not associated with a set of network addresses, the interception module 111 simply calls the subroutine 205 such that execution control returns to the calling process 107 after the subroutine 205 executes.

If the process 107 is selected, the interception module 111 first determines whether or not the communication channel that was passed to the subroutine 205 is already associated with a network address. If the communication channel is not already associated with a network address, the interception module 111 associates the communication channel with a random one of the network addresses via which the process 107 is permitted to communicate. The interception module 111 calls the subroutine 205, which facilitates the network address-based communication by the process 107. The communication channel has now been associated with one of the network addresses via which the process 107 is permitted to communicate. Therefore, the subsequent network address-based communication facilitated by the subroutine 107 will be via this permitted network address.

If the communication channel is already associated with a network address, the interception module 111 determines whether or not that network address is one of the network addresses via which the process 107 is permitted to communicate. If the network address is one of the network addresses via which the process 107 is permitted to communicate, then the interception module 111 calls the subroutine 205. The subroutine 205 facilitates the network address-based communication via the network address. Execution control then returns to the calling process 107 after the subroutine 205 executes.

If the network address with which the communication channel is associated is not one of the network addresses via which the process 107 is permitted to communicate, the interception module 111 generates an error condition. In one embodiment, the interception module 111 generates an error condition by throwing an exception. In another embodiment, the interception module 111 generates an error condition by returning an error code to the process 107 that called the subroutine 205. Regardless, the process 107 is unable to communicated via the unassociated network address.

e. Managing Communication Via Multiple Addresses

Recall that a communication channel can be associated with a wildcard network address. An attempt to create such an association is a request by a process 107 that subsequent communication utilizing the communication channel be conducted via any available network address. Such a communication channel can be thought of as a wildcard communication channel. In the embodiment depicted in FIG. 3A and FIG. 3B, when a process 107 attempts to associate a communication channel with a wildcard network address, the interception module 111 associates the communication channel with a set of communication channel-network address pairs that includes each network address of the permitted set, as described above. Subsequent communication utilizing the channel can be via any one of the channel-address pairs that is available. Therefore, in the embodiment depicted in FIG. 3A and FIG. 3B, certain communication protocol subroutines 139 and certain system calls 115 are intercepted to ensure that communication utilizing a wildcard communication channel (listening socket) is via any available address in the set, but not via an address not in the set.

i. Receiving Incoming Requests to Initiate Communication

In the embodiment depicted in FIG. 3A and FIG. 3B, subroutines 307 that receive, on an existing communication channel, an incoming request to initiate a communication session are intercepted (e.g., the TCP/IP accept function). Under TCP/IP and other communication protocols, a process 107 can pass such a subroutine 307 either a communication channel that is associated with a specific network address, or a wildcard communication channel. When a process 107 passes a wildcard communication channel, the process 107 is requesting that an incoming request be received via whatever network address is available. In the case of the embodiment depicted in FIG. 3A and FIG. 3B, the request can be received via any one of the addresses in the set, so it is desirable to determine which address in the set is available first, and then to receive the request via that address.

When a process 107 calls a subroutine 307 that receives an incoming request to initiate a communication session, the operating system 117 uses the pointer 118 in the communication protocol stack 131 to execute the interception module 111. The interception module 111 determines whether the communication channel that the process 107 passed to the subroutine 307 is a wildcard communication channel. To so determine, the interception module 111 examines the indicator 309 in the auxiliary table 305 to determine whether the communication channel is associated with a set of communication channel-network address pairs 303. If so the channel is a wildcard channel, and an incoming communication request can be received via any one of the communication channel-network address pairs 303. Therefore, the interception module 111 retrieves the pairs 303 from the auxiliary table 305, and proceeds to identify one of the channel-network pairs 303 that is presently ready to receive an incoming communication request. If none of the pairs 303 are ready, the interception module 111 waits until a first one is ready. In order to identify one of the communication channel-network address pairs 303 as being ready to accept an incoming communication request, the interception module 111 preferably calls a communication protocol subroutine 139 that determines which of a specified set of communication channels is ready to receive an incoming communication request (e.g. the TCP/IP select function). Once a pair 303 is identified as ready, the interception module 111 calls the subroutine 307 that receives an incoming request to initiate a communication session, and passes it the communication channel that has been identified as being ready to receive the incoming request. Because the communication channel is ready to receive the incoming request, when the subroutine 307 executes the channel receives the request immediately, and the subroutine 307 proceeds to return control to the calling process 107.

If the existing communication channel is not a wildcard channel, then the interception module 111 simply calls the subroutine 307 for the process 107, passing it the communication channel.

ii. Identifying Available Communication Channels

Also intercepted are subroutines 311 that identify an available communication channel (e.g., the TCP/IP select function). Under TCP/IP and other communication protocols, a process 107 can pass such a subroutine 311 one or more communication channels, and the subroutine 311 will indicate a first one of the channels to become available for communication. Recall that a wildcard communication channel is associated with a set of communication channel-network address pairs 303. If a process passes a wildcard communication channel to a subroutine 311 that identifies an available communication channel, it is desirable to pass the subroutine 311 not the wildcard to communication channel, but instead all of the communication channels of the set of pairs 303 associated with the wildcard channel.

When a process 107 calls a subroutine 311 that identifies an available communication channel, the operating system 117 uses the pointer 118 in the communication protocol stack 131 to execute the interception module 111. The interception module 111 determines whether the process 107 passed a wildcard communication channel to the subroutine 307. If so, the interception module 111 retrieves the set of communication channel-network address pairs 303 associated with the wildcard communication channel. The interception module 111 proceeds to call the subroutine 311, passing it the communication channels of the pairs 303 in place of the wildcard communication channel. In other words, the wildcard communication channel is expanded into all of the communication channels associated therewith.

If the subroutine 311 was passed only a wildcard communication channel, the interception module 111 passes the subroutine 311 all of the associated channels, and the subroutine 311 indicates a first one to be ready for communication. If the subroutine 311 was passed a wildcard communication channel and other, non-wildcard communication channels, the interception module 311 passes the subroutine 311 all of the channels associated with the wildcard channel, plus the other, non-wildcard channels passed to the subroutine 311. The subroutine 311 then indicates the first one of all of these channels to be ready for communication. If no communication channel passed to the subroutine 311 is a wildcard channel, then the interception module 111 simply calls the subroutine 307 for the process 107.

iii. Duplicating Communication Channels

Also intercepted are system calls 115 that duplicate a communication channel (e.g. the UNIX® dup and dup2 functions). Whenever such a system call 115 is made, the interception module 111 determines whether the channel to be duplicated is a wildcard channel. To so determine, the interception module 111 examines the indicators 309 in the auxiliary table 305 to determine whether or not the channel to be duplicated is associated with a set of channel-address pairs 303. If so, after allowing the system call 115 to execute and duplicate the channel, the interception module 111 stores an indicator 309 in the auxiliary table 305 that the duplicate of the channel is associated with the set of channel-address pairs 303 with which the duplicated wildcard channel is associated. Then, if a process 107 subsequently uses the duplicate of the channel for communication, the interception module 111 will be able to determine that the duplicate is a wild card channel.

If the channel to be duplicated is not a wildcard channel, the interception module 111 simply makes the system call for the process 107.

iv. Closing Communication Channels

Also intercepted are system calls 115 that close a communication channel (e.g. the UNIX® close function). Whenever such a system call 115 is made, the interception module 111 determines whether the communication channel to be closed is a wildcard channel. If so, the interception module 111 determines if any duplicates of the channel have been made. To so determine, the interception module 111 examines the indicators 309 in the auxiliary table 305 to determine if any other channels are associated with the set of channel-address pairs 303 with which the wildcard channel to be closed is associated. If at least one duplicate of the channel exists, the interception module 111 takes no action concerning the set of pairs 303. If no duplicates exist, the channel to be closed is the only channel associated with the set of pairs 303, so the interception module 111 deletes the set of pairs 303 from the auxiliary table 305. Regardless, the interception module proceeds to make the system call 115 to close the communication channel for the process 107.

IV. Alternative Embodiments

It is to be understood that in one embodiment of the present invention, rather than modifying a communications protocol stack 131, the present invention intercepts certain system calls 115 associated with network address-based communication. Each communication protocol subroutine 139 is associated with a system call 115. A communication protocol stack 131 and its subroutines 139 are at a lower than system calls 115. In order to request a communication task, a process 107 can make a system call 115, which, in turn, calls the subroutine 139 in the appropriate communication protocol stack 131. Thus, interception of the appropriate system calls 115 achieves the same result as the modification of the communication protocol stack 131. Thus, intercepting either the system calls 115 (higher level) or the communication protocol subroutines 139 (lower level) will generate the same result.

What is claimed is:

1. A computer system for restricting network address based communication, comprising:
   means for associating at least one selected process with at least two network addresses;
   means for determining whether an attempted network address-based communication of a selected process is via an associated address; and
   means for allowing the communication to proceed if the communication is via an associated address.

2. The computer system of claim 1 further comprising:
   means for loading at least one selected process into computer memory; and
   means for storing at least one association, between the process and at least one network address.

3. The computer system of claim 1 wherein:
   associations between selected processes and network addresses are stored in an association table in a computer memory of the computer system.

4. The computer system of claim 3 wherein:
   the association table is stored in operating system address space.

5. The computer system of claim 1 wherein:
   a network address-based communication comprises an attempt to designate a network address to be used for subsequent communication.

6. The computer system of claim 1 wherein:
   a network address-based communication comprises an attempt to associate a communication channel with a network address.

7. The computer system of claim 1 wherein:
   a network address-based communication comprises an attempt to communicate without designating a network address to be used for communication.

8. The computer system of claim 1 wherein:
   a network address-based communication comprises an attempt to establish a connection to a second process.

9. The computer system of claim 1 wherein:
   a network address-based communication comprises an attempt to transmit data to a second process.

10. The computer system of claim 9 wherein:
    the second process is executing in a computer memory of the computer system.

11. The computer system of claim 9 wherein:
    the second process executes in a computer memory of a second computer system.

12. The computer system of claim 1 further comprising:
    means for determining whether an attempted network address-based communication is via an associated address by intercepting system calls that pertain to network address-based communication.

13. The computer system of claim 1 further comprising:
    means for associating a child process of a selected process with a single network address with which the selected process is associated;
    means for determining whether network address-based communication of the child process is via the associated address; and
    means for allowing the communication to proceed if it is determined that the communication is via the associated address.

14. The computer system of claim 1 further comprising:
    means for associating a child process of a selected process with at least two network addresses with which the selected process is associated;
    means for determining whether network address-based communication of the child process is via an associated address; and
    means for allowing the communication to proceed if it is determined that the communication is via an associated address.

15. The computer system of claim 1 further comprising:
    means for detecting termination of a selected process; and
    means for deleting all associations between the process and network addresses.

16. A computer system for restricting network address-based communication by selected processes to a set of specific network addresses, comprising:

means for associating at least one selected process with at least two network addresses;
means for determining whether an attempted network address-based communication of a selected process is via an associated address; and
means for not allowing the attempted communication to proceed if it is determined that the attempted communication is not via an associated address.

17. A computer system for restricting network address-based communication by selected processes to specific network addresses, comprising:
means for associating at least two selected processes with at least one network address;
means for detecting an attempt by a selected process to associate a communication channel with a network address; and
means for determining whether the network address with which the selected process is attempting to associate a communication channel is associated with the selected process.

18. The computer system of claim 17 further comprising:
allowing the communication channel to be associated with the network address if it is determined that the network address is associated with the selected process.

19. A computer system for restricting network address-based communication by selected processes to specific network addresses, the method comprising:
means for associating at least one selected process with at least two network addresses;
means for detecting an attempt by a selected process to associate a communication channel with a network address, wherein a provided value for the network address comprises a wild card; and
means for associating the communication channel with a network address that is associated with the process.

20. The computer system of claim 19, the computer system further comprising:
means for associating the communication channel with one of the at least two network addresses, resulting in a communication channel-network address pair;
means for establishing one communication channel per each additional one of the at least two network addresses;
means for associating each established communication channel with one of the at least two network addresses, resulting in additional communication channel-network address pairs; and
means for associating the communication channel with the communication channel, network address pairs.

21. A computer system for restricting network address-based communication by selected processes to specific network addresses, comprising:
means for associating at least two selected processes with a unique local host address;
means for detecting an attempt by a selected process to communicate with a local host; and
means for designating the unique local host address associated with the selected process to be used by the selected process to communicate with the local host.

22. A computer system for restricting network address-based communication by selected processes to specific network addresses, comprising:
means for associating at least one selected process with at least two network addresses;
means for detecting an attempt by a selected process to communicate with a second process via a communication channel;
means for determining if the communication channel is associated with a network address; and
means for associating the communication channel with a network address that is associated with the process if it is determined that the communication channel is not associated with a network address.

23. A computer system for restricting network address-based communication by selected processes to specific network addresses, comprising:
means for associating at least one selected process with at least two network addresses;
means for detecting an attempt by a selected process to establish a connection between a communication channel and a second process;
means for determining if the communication channel is associated with a network address; and
means for associating the communication channel with a network address that is associated with the selected process if it is determined that the communication channel is not associated with a network address.

24. A computer system for restricting network address-based communication by selected processes to a set of specific network addresses, comprising:
a processor and one or more memories;
a component configured to associate at least two selected processes with at least one network address;
a component configured to determine whether an attempted network address-based communication of a selected process is via an associated address; and
a component configured to, in response to a determination that the communication is via an associated address, allow the communication to proceed.

25. The computer system of claim 24 further comprising:
a component configured to load at least one selected process into computer memory; and
a component configured to store at least one association between the process and at least one network address.

26. A computer system for restricting network address-based communication by selected processes to a set of specific network addresses:
a processor and one or more memories;
a component configured to associate at least one selected process with at least two network addresses;
a component configured to determine whether an attempted network address-based communication of a selected process is via an associated address;
a component configured to, in response to a determination that the communication is not via an associated address, not allow the attempted communication to proceed.

27. A computer system for restricting network address-based communication by selected processes to specific network addresses, comprising:
a component configured to associate at least one selected process with at least two network addresses;
a component configured to detect an attempt by a selected process to associate a communication channel with a network address; and
a component configured to determine whether the network address with which the selected process is attempting to associate a communication channel is associated with the selected process.

28. A computer system for restricting network address-based communication by selected processes to specific network addresses, comprising:
a processor and one or more memories;
a component configured to associate at least two selected processes with at least one network address;

a component configured to detect an attempt by a selected process to associate a communication channel with a network address, wherein a provided value for the network address comprises a wild card; and a component configured to associate the communication channel with a network address that is associated with the process.

29. The computer system of claim 28 wherein the selected process is associated with multiple network addresses; the computer system comprising:

a component configured to associate the communication channel with one of the multiple network addresses, resulting in a communication channel-network address pair;

a component configured to establish one communication channel per each additional one of the multiple network addresses;

a component configured to associate each established communication channel with one of the multiple network addresses, resulting in additional communication channel-network address pairs; and a component configured to associate the communication channel with the communication channel, network address pairs.

30. A computer system for restricting network address-based communication by selected processes to specific network addresses, comprising:

a component configured to associate at least two selected processes with a unique local host address;

a component configured to detect an attempt by a selected process to communicate with a local host; and a component configured to designate the unique local host address associated with the selected process to be used by the selected process to communicate with the local host.

31. A computer system for restricting network address-based communication by selected processes to specific network addresses, comprising:

a component configured to associate at least one selected process with at least two network addresses;

a component configured to detect an attempt by a selected process to communicate with a second process via a communication channel;

a component configured to determine if the communication channel is associated with a network address; and a component configured to, in response to determining that the communication channel is not associated with a network address, associate the communication channel with a network address that is associated with the process.

32. A computer system for restricting network address-based communication by selected processes to specific network addresses, comprising:

a component configured to associate at least one selected process with at least two network addresses;

a component configured to detect an attempt by a selected process to establish a connection between a communication channel and a second process;

a component configured to determine if the communication channel is associated with a network address; and a component configured to, in response to determining that the communication channel is not associated with a network address, associate the communication channel with a network address that is associated with the selected process.

33. The computer system of claim 32 further comprising:

a component configured to, in response to a determination that the communication channel is associated with a network address that is not associated with the selected process, not allow the connection to be established.

34. A computer system for restricting network address-based communication by selected processes to a set of specific network addresses, comprising:

a component configured to associate at least two selected processes with at least one network address;

a component configured to detect when a selected process attempts to communicate via an unassociated address; and a component configured to not allow the attempted communication to proceed.

35. A computer system for restricting network address-based communication by selected processes to a set of specific network addresses, comprising:

a component configured to associate at least one selected process with at least two network addresses;

a component configured to detect when an elected process attempts to communicate via an unassociated address; and a component configured to not allow attempted communication to proceed.

* * * * *

UNITED STATES PATENT AND TRADEMARK OFFICE
CERTIFICATE OF CORRECTION

PATENT NO. : 8,489,764 B2
APPLICATION NO. : 12/772982
DATED : July 16, 2013
INVENTOR(S) : Goyal It is certified that error appears in the above-identified patent and that said Letters Patent is hereby corrected as shown below:

In the Specification:

In Column 9, Lines 15-16, delete "interception model 111." and insert -- interception module 111. --, therefor.

In Column 10, Line 18, delete "interception model 111." and insert -- interception module 111. --, therefor.

In Column 12, Line 4, delete "system call 303" and insert -- system call 115 --, therefor.

In Column 12, Line 5, delete "system call 303. The system call 303" and insert -- system call 115. The system call 115 --, therefor.

In Column 12, Line 9, delete "system call 303" and insert -- system call 115 --, therefor.

In Column 17, Line 58, delete "system call 303" and insert -- system call 115 --, therefor.

In Column 17, Line 59, delete "system call 303. The system call 303" and insert -- system call 115. The system call 115 --, therefor.

In Column 17, Line 61, delete "system call 303" and insert -- system call 115 --, therefor.

Signed and Sealed this
First Day of April, 2014

Michelle K. Lee
*Deputy Director of the United States Patent and Trademark Office*